US009152622B2

(12) United States Patent
Marcu et al.

(10) Patent No.: US 9,152,622 B2
(45) Date of Patent: Oct. 6, 2015

(54) PERSONALIZED MACHINE TRANSLATION VIA ONLINE ADAPTATION

(71) Applicants: Daniel Marcu, Manhattan Beach, CA (US); Jonathan May, Los Angeles, CA (US)

(72) Inventors: Daniel Marcu, Manhattan Beach, CA (US); Jonathan May, Los Angeles, CA (US)

(73) Assignee: Language Weaver, Inc., Los Angeles, CA (US)

( * ) Notice: Subject to any disclaimer, the term of this patent is extended or adjusted under 35 U.S.C. 154(b) by 401 days.

(21) Appl. No.: 13/685,372

(22) Filed: Nov. 26, 2012

(65) Prior Publication Data

US 2014/0149102 A1     May 29, 2014

(51) Int. Cl.
*G06F 17/28* (2006.01)

(52) U.S. Cl.
CPC ........ *G06F 17/2827* (2013.01); *G06F 17/2854* (2013.01)

(58) Field of Classification Search
CPC . G06F 17/28; G06F 17/2818; G06F 17/2836; G06F 17/2854; G06Q 50/01
USPC ........ 704/2, 9, 7, 4, 3; 701/510; 707/740, 706
See application file for complete search history.

(56) References Cited

U.S. PATENT DOCUMENTS

| | | |
|---|---|---|
| 4,502,128 A | 2/1985 | Okajima et al. |
| 4,599,691 A | 7/1986 | Sakaki et al. |
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |
| 4,814,987 A | 3/1989 | Miyao et al. |
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,175,684 A | 12/1992 | Chong |

(Continued)

FOREIGN PATENT DOCUMENTS

| | | |
|---|---|---|
| CA | 2408819 | 11/2006 |
| CA | 2475857 | 12/2008 |

(Continued)

OTHER PUBLICATIONS

Abney, Steven P. , "Parsing by Chunks," 1991, Principle-Based Parsing: Computation and Psycholinguistics, vol. 44, pp. 257-279.

(Continued)

*Primary Examiner* — Michael Colucci
(74) *Attorney, Agent, or Firm* — Carr & Ferrell LLP

(57) ABSTRACT

Personalizing machine translation via online adaptation is described herein. According to some embodiments, methods for providing personalized machine translations may include receiving translator feedback regarding machine translations generated by a machine translation system for a translator, determining translator feedback that improves translations generated by the machine translation system, and incorporating the determined translator feedback into the translation methodology of the machine translation system to personalize the translation methodology.

21 Claims, 6 Drawing Sheets

(56) References Cited

U.S. PATENT DOCUMENTS

| | | |
|---|---|---|
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |
| 5,302,132 A | 4/1994 | Corder |
| 5,311,429 A | 5/1994 | Tominaga |
| 5,387,104 A | 2/1995 | Corder |
| 5,408,410 A | 4/1995 | Kaji |
| 5,432,948 A | 7/1995 | Davis et al. |
| 5,442,546 A | 8/1995 | Kaji et al. |
| 5,477,450 A | 12/1995 | Takeda et al. |
| 5,477,451 A | 12/1995 | Brown et al. |
| 5,488,725 A | 1/1996 | Turtle et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,587,902 A | 12/1996 | Kugimiya |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,850,561 A | 12/1998 | Church et al. |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,893,134 A | 4/1999 | O'Donoghue et al. |
| 5,903,858 A | 5/1999 | Saraki |
| 5,907,821 A | 5/1999 | Kaji et al. |
| 5,909,681 A | 6/1999 | Passera et al. |
| 5,930,746 A | 7/1999 | Ting |
| 5,960,384 A | 9/1999 | Brash |
| 5,963,205 A | 10/1999 | Sotomayor |
| 5,966,685 A | 10/1999 | Flanagan et al. |
| 5,966,686 A | 10/1999 | Heidorn et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,047,252 A | 4/2000 | Kumano et al. |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,119,078 A | 9/2000 | Kobayakawa et al. |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,185,524 B1 | 2/2001 | Carus et al. |
| 6,205,456 B1 | 3/2001 | Nakao |
| 6,206,700 B1 | 3/2001 | Brown et al. |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,473,896 B1 | 10/2002 | Hicken et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,598,046 B1 | 7/2003 | Goldberg et al. |
| 6,604,101 B1 | 8/2003 | Chan et al. |
| 6,609,087 B1 | 8/2003 | Miller et al. |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,745,176 B2 | 6/2004 | Probert, Jr. et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 | 4/2005 | Hull |
| 6,901,361 B1 | 5/2005 | Portilla |
| 6,904,402 B1 | 6/2005 | Wang et al. |
| 6,910,003 B1 | 6/2005 | Arnold et al. |
| 6,952,665 B1 | 10/2005 | Shimomura et al. |
| 6,983,239 B1 | 1/2006 | Epstein |
| 6,993,473 B2 | 1/2006 | Cartus |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,050,964 B2 | 5/2006 | Menzes et al. |
| 7,054,803 B2 | 5/2006 | Eisele |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,143,036 B2 | 11/2006 | Weise |

(56) References Cited

U.S. PATENT DOCUMENTS

| | | |
|---|---|---|
| 7,146,358 B1 | 12/2006 | Gravano et al. |
| 7,149,688 B2 | 12/2006 | Schalkwyk |
| 7,171,348 B2 | 1/2007 | Scanlan |
| 7,174,289 B2 | 2/2007 | Sukehiro |
| 7,177,792 B2 | 2/2007 | Knight et al. |
| 7,191,115 B2 | 3/2007 | Moore |
| 7,194,403 B2 | 3/2007 | Okura et al. |
| 7,197,451 B1 | 3/2007 | Carter et al. |
| 7,200,550 B2 | 4/2007 | Menezes et al. |
| 7,206,736 B2 | 4/2007 | Moore |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,295,963 B2 | 11/2007 | Richardson et al. |
| 7,302,392 B1 | 11/2007 | Thenthiruperai et al. |
| 7,319,949 B2 | 1/2008 | Pinkham |
| 7,328,156 B2 | 2/2008 | Meliksetian et al. |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,356,457 B2 | 4/2008 | Pinkham et al. |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,552,053 B2 | 6/2009 | Gao et al. |
| 7,565,281 B2 | 7/2009 | Appleby |
| 7,574,347 B2 | 8/2009 | Wang |
| 7,580,828 B2 | 8/2009 | D'Agostini |
| 7,580,830 B2 | 8/2009 | Al-Onaizan et al. |
| 7,584,092 B2 | 9/2009 | Brockett et al. |
| 7,587,307 B2 | 9/2009 | Cancedda et al. |
| 7,620,538 B2 | 11/2009 | Marcu et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,636,656 B1 | 12/2009 | Nieh |
| 7,680,646 B2 | 3/2010 | Lux-Pogodalla et al. |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,801,720 B2 | 9/2010 | Satake et al. |
| 7,813,918 B2 | 10/2010 | Muslea et al. |
| 7,822,596 B2 | 10/2010 | Elgazzar et al. |
| 7,925,494 B2 | 4/2011 | Cheng et al. |
| 7,957,953 B2 | 6/2011 | Moore |
| 7,974,833 B2 | 7/2011 | Soricut et al. |
| 7,974,976 B2 | 7/2011 | Yahia et al. |
| 7,983,897 B2 * | 7/2011 | Chin et al. .................. 704/2 |
| 8,060,360 B2 | 11/2011 | He |
| 8,145,472 B2 | 3/2012 | Shore et al. |
| 8,214,196 B2 | 7/2012 | Yamada et al. |
| 8,219,382 B2 | 7/2012 | Kim et al. |
| 8,234,106 B2 | 7/2012 | Marcu et al. |
| 8,244,519 B2 | 8/2012 | Bicici et al. |
| 8,249,854 B2 | 8/2012 | Nikitin et al. |
| 8,265,923 B2 | 9/2012 | Chatterjee et al. |
| 8,275,600 B2 | 9/2012 | Bilac et al. |
| 8,296,127 B2 | 10/2012 | Marcu et al. |
| 8,315,850 B2 | 11/2012 | Furuuchi et al. |
| 8,326,598 B1 | 12/2012 | Macherey et al. |
| 8,380,486 B2 | 2/2013 | Soricut et al. |
| 8,433,556 B2 | 4/2013 | Fraser et al. |
| 8,442,813 B1 | 5/2013 | Popat |
| 8,468,149 B1 | 6/2013 | Lung et al. |
| 8,504,351 B2 * | 8/2013 | Waibel et al. ................ 704/2 |
| 8,543,563 B1 * | 9/2013 | Nikoulina et al. ......... 707/706 |
| 8,548,794 B2 | 10/2013 | Koehn |
| 8,600,728 B2 | 12/2013 | Knight et al. |
| 8,615,389 B1 | 12/2013 | Marcu |
| 8,655,642 B2 | 2/2014 | Fux et al. |
| 8,666,725 B2 * | 3/2014 | Och ............................ 704/4 |
| 8,676,563 B2 | 3/2014 | Soricut et al. |
| 8,694,303 B2 | 4/2014 | Hopkins et al. |
| 8,762,128 B1 | 6/2014 | Brants et al. |
| 8,825,466 B1 | 9/2014 | Wang et al. |
| 8,831,928 B2 | 9/2014 | Marcu et al. |
| 8,886,515 B2 | 11/2014 | Van Assche |
| 8,886,517 B2 | 11/2014 | Soricut et al. |
| 8,886,518 B1 | 11/2014 | Wang et al. |
| 8,942,973 B2 | 1/2015 | Viswanathan |
| 8,943,080 B2 | 1/2015 | Marcu et al. |
| 8,977,536 B2 * | 3/2015 | Och ............................ 704/4 |
| 8,990,064 B2 | 3/2015 | Marcu et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0083029 A1 | 6/2002 | Chun et al. |
| 2002/0087313 A1 | 7/2002 | Lee et al. |
| 2002/0099744 A1 | 7/2002 | Coden et al. |
| 2002/0107683 A1 | 8/2002 | Eisele |
| 2002/0111788 A1 | 8/2002 | Kimpara |
| 2002/0111789 A1 | 8/2002 | Hull |
| 2002/0111967 A1 | 8/2002 | Nagase |
| 2002/0143537 A1 | 10/2002 | Ozawa et al. |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0004705 A1 | 1/2003 | Kempe |
| 2003/0009322 A1 | 1/2003 | Marcu |
| 2003/0023423 A1 | 1/2003 | Yamada et al. |
| 2003/0040900 A1 | 2/2003 | D'Agostini |
| 2003/0061022 A1 | 3/2003 | Reinders |
| 2003/0129571 A1 | 7/2003 | Kim |
| 2003/0144832 A1 | 7/2003 | Harris |
| 2003/0154071 A1 | 8/2003 | Shreve |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 | 12/2003 | Soricut et al. |
| 2004/0006560 A1 | 1/2004 | Chan et al. |
| 2004/0015342 A1 | 1/2004 | Garst |
| 2004/0023193 A1 | 2/2004 | Wen et al. |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0044530 A1 | 3/2004 | Moore |
| 2004/0059708 A1 | 3/2004 | Dean et al. |
| 2004/0068411 A1 | 4/2004 | Scanlan |
| 2004/0098247 A1 | 5/2004 | Moore |

(56) References Cited

U.S. PATENT DOCUMENTS

| | | |
|---|---|---|
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1 | 6/2004 | Butt |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021323 A1 | 1/2005 | Li |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0055199 A1 | 3/2005 | Ryzchachkin et al. |
| 2005/0055217 A1 | 3/2005 | Sumita et al. |
| 2005/0060160 A1 | 3/2005 | Roh et al. |
| 2005/0075858 A1 | 4/2005 | Pournasseh et al. |
| 2005/0086226 A1 | 4/2005 | Krachman |
| 2005/0102130 A1 | 5/2005 | Quirk et al. |
| 2005/0107999 A1 | 5/2005 | Kempe et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0136824 A1 | 6/2006 | Lin |
| 2006/0142995 A1 | 6/2006 | Knight et al. |
| 2006/0150069 A1 | 7/2006 | Chang |
| 2006/0165040 A1 | 7/2006 | Rathod et al. |
| 2006/0167984 A1 | 7/2006 | Fellenstein et al. |
| 2006/0190241 A1 | 8/2006 | Goutte et al. |
| 2007/0015121 A1 | 1/2007 | Johnson et al. |
| 2007/0016400 A1 | 1/2007 | Soricutt et al. |
| 2007/0016401 A1 | 1/2007 | Ehsani et al. |
| 2007/0033001 A1 | 2/2007 | Muslea et al. |
| 2007/0043553 A1 | 2/2007 | Dolan |
| 2007/0050182 A1* | 3/2007 | Sneddon et al. ............... 704/2 |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0208719 A1 | 9/2007 | Tran |
| 2007/0219774 A1 | 9/2007 | Quirk et al. |
| 2007/0233460 A1 | 10/2007 | Lancaster et al. |
| 2007/0233547 A1 | 10/2007 | Younger et al. |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1* | 12/2007 | Shore et al. ............... 704/2 |
| 2008/0040095 A1 | 2/2008 | Sinha et al. |
| 2008/0052061 A1 | 2/2008 | Kim et al. |
| 2008/0065478 A1 | 3/2008 | Kohlmeier et al. |
| 2008/0109209 A1 | 5/2008 | Fraser et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0195461 A1 | 8/2008 | Li et al. |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0300857 A1* | 12/2008 | Barbaiani et al. ............... 704/4 |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0106017 A1 | 4/2009 | D'Agostini |
| 2009/0119091 A1 | 5/2009 | Sarig |
| 2009/0125497 A1 | 5/2009 | Jiang et al. |
| 2009/0198487 A1 | 8/2009 | Wong et al. |
| 2009/0234634 A1 | 9/2009 | Chen et al. |
| 2009/0234635 A1 | 9/2009 | Bhatt et al. |
| 2009/0241115 A1 | 9/2009 | Raffo et al. |
| 2009/0248662 A1* | 10/2009 | Murdock ............... 707/5 |
| 2009/0313006 A1* | 12/2009 | Tang ............... 704/2 |
| 2009/0326912 A1 | 12/2009 | Ueffing |
| 2009/0326913 A1 | 12/2009 | Simard et al. |
| 2010/0005086 A1 | 1/2010 | Wang et al. |
| 2010/0017293 A1 | 1/2010 | Lung et al. |
| 2010/0042398 A1 | 2/2010 | Marcu et al. |
| 2010/0138210 A1 | 6/2010 | Seo et al. |
| 2010/0138213 A1 | 6/2010 | Bicici et al. |
| 2010/0174524 A1 | 7/2010 | Koehn |
| 2011/0029300 A1 | 2/2011 | Marcu et al. |
| 2011/0066643 A1 | 3/2011 | Cooper et al. |
| 2011/0082683 A1* | 4/2011 | Soricut et al. ............... 704/2 |
| 2011/0082684 A1 | 4/2011 | Soricut et al. |
| 2011/0184722 A1* | 7/2011 | Sneddon et al. ............... 704/7 |
| 2011/0191096 A1* | 8/2011 | Sarikaya et al. ............... 704/3 |
| 2011/0191410 A1 | 8/2011 | Refuah et al. |
| 2011/0225104 A1 | 9/2011 | Soricut et al. |
| 2012/0016657 A1 | 1/2012 | He et al. |
| 2012/0096019 A1 | 4/2012 | Manickam et al. |
| 2012/0116751 A1* | 5/2012 | Bernardini et al. ............... 704/3 |
| 2012/0136646 A1 | 5/2012 | Kraenzel et al. |
| 2012/0150441 A1* | 6/2012 | Ma et al. ............... 701/510 |
| 2012/0150529 A1* | 6/2012 | Kim et al. ............... 704/2 |
| 2012/0191457 A1 | 7/2012 | Minnis et al. |
| 2012/0253783 A1 | 10/2012 | Castelli et al. |
| 2012/0265711 A1 | 10/2012 | Assche |
| 2012/0278302 A1 | 11/2012 | Choudhury et al. |
| 2012/0323554 A1 | 12/2012 | Hopkins et al. |
| 2013/0018650 A1* | 1/2013 | Moore et al. ............... 704/9 |
| 2013/0024184 A1 | 1/2013 | Vogel et al. |
| 2013/0103381 A1 | 4/2013 | Assche |
| 2013/0124185 A1* | 5/2013 | Sarr et al. ............... 704/2 |
| 2013/0144594 A1* | 6/2013 | Bangalore et al. ............... 704/2 |
| 2013/0238310 A1 | 9/2013 | Viswanathan |
| 2013/0290339 A1* | 10/2013 | LuVogt et al. ............... 707/740 |
| 2014/0006003 A1 | 1/2014 | Soricut et al. |
| 2014/0019114 A1 | 1/2014 | Travieso et al. |
| 2014/0188453 A1 | 7/2014 | Marcu et al. |
| 2015/0106076 A1 | 4/2015 | Hieber; Felix ; et al. |

FOREIGN PATENT DOCUMENTS

| | | |
|---|---|---|
| CA | 2480398 | 6/2011 |
| DE | 1488338 | 4/2010 |
| DE | 202005022113.9 | 2/2014 |
| EP | 0469884 | 2/1992 |
| EP | 0715265 | 6/1996 |
| EP | 0933712 | 8/1999 |
| EP | 0933712 | 1/2001 |
| EP | 1488338 | 9/2004 |
| EP | 1488338 | 4/2010 |
| ES | 1488338 | 4/2010 |
| FR | 1488338 | 4/2010 |

(56) References Cited

FOREIGN PATENT DOCUMENTS

| | | |
|---|---|---|
| HK | 1072987 | 2/2006 |
| HK | 1072987 | 9/2010 |
| JP | 07244666 | 9/1995 |
| JP | 10011447 | 1/1998 |
| JP | 11272672 | 10/1999 |
| JP | 2004501429 | 1/2004 |
| JP | 2004062726 | 2/2004 |
| JP | 2008101837 | 5/2008 |
| JP | 5452868 | 1/2014 |
| UA | 1488338 | 4/2010 |
| WO | WO03083709 | 10/2003 |
| WO | WO03083710 | 10/2003 |
| WO | WO2004042615 | 5/2004 |
| WO | WO2007056563 | 5/2007 |
| WO | WO2011041675 | 4/2011 |
| WO | WO2011162947 | 12/2011 |

OTHER PUBLICATIONS

Zhang et al., "Distributed Language Modeling for N-best List Reranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.

Patent Cooperation Treaty International Preliminary Report or Patentability and The Written Opinion, International application number PCT/US2008/004296. Oct. 6, 2009, 5 pgs.

Document, Wikipedia.com, web.archive.org (Feb. 22, 2004) <http://web.archive.org/web/20040222202831 /http://en.wikipedia.org/wikiiDocument>, Feb. 22, 2004.

Identifying, Dictionary.com, wayback.archive.org (Feb. 28, 2007) </http://dictionary.reference.com/browse/identifying>, accessed Oct. 27, 2011 <http://web.archive.org/web/20070228150533/http://dictionary.reference.com/browse/identifying>.

Koehn, P. et al, "Statistical Phrase-Based Translation," Proceedings of HLT-NAACL 2003 Main Papers, pp. 48-54 Edmonton, May-Jun. 2003.

Abney, S.P., "Stochastic Attribute Value Grammars", Association for Computational Linguistics, 1997, pp. 597-618.

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.

Tillman, C., et al, "Word Reordering and a Dynamic Programming Beam Search Algorithm for Statistical Machine Translation," 2003, Association for Computational Linguistics, vol. 29, No. 1, pp. 97-133 <URL: http://acl.ldc.upenn.edu/J/J03/J03-1005.pdf>.

Wang, W. et al. "Capitalizing Machine Translation" In HLT-NAACL '06 Proceedings Jun. 2006. <http://www.isi.edu/natural-language/mt/hlt-naacl-06-wang.pdf>.

Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.

Ueffing et al., "Using POS Information for Statistical Machine Translation into Morphologically Rich Languages," in EACL, 2003: Proceedings of the Tenth Conference on European Chapter of the Association for Computational Linguistics, pp. 347-354.

Frederking et al., "Three Heads are Better Than One," In Proceedings of the 4th Conference on Applied Natural Language Processing, Stuttgart, Germany, 1994, pp. 95-100.

Och et al., "Discriminative Training and Maximum Entropy Models for Statistical Machine Translation," In Proc. Of the 40th Annual Meeting of the Association for Computational Linguistics (ACL), Philadelphia, PA, 2002.

Yasuda et al., "Automatic Machine Translation Selection Scheme to Output the Best Result," Proc. of LREC, 2002, pp. 525-528.

Papineni et al., "Bleu: a Method for Automatic Evaluation of Machine Translation", Proc. Of the 40th Annual Meeting of the Association for Computational Linguistics (ACL), Jul. 2002, pp. 311-318.

Shaalan et al., "Machine Translation of English Noun Phrases into Arabic", (2004), vol. 17, No. 2, International Journal of Computer Processing of Oriental Languages, 14 pages.

Isahara et al., "Analysis, Generation and Semantic Representation in CONTRAST—A Context-Based Machine Translation System", 1995, Systems and Computers in Japan, vol. 26, No. 14, pp. 37-53.

Proz.com, Rates for proofreading versus Translating, http://www.proz.com/forum/business_issues/202-rates_for_proofreading_versus_translating.html, Apr. 23, 2009, retrieved Jul. 13, 2012.

Celine, Volume discounts on large translation project, naked translations, http://www.nakedtranslations.com/en/2007/volume-discounts-on-large-translation-projects/, Aug. 1, 2007, retrieved Jul. 16, 2012.

Graehl, J and Knight, K, May 2004, Training Tree Transducers, In NAACL-HLT (2004), pp. 105-112.

Niessen et al, "Statistical machine translation with scarce resources using morphosyntactic information", Jun. 2004, Computational Linguistics, vol. 30, issue 2, pp. 181-204.

Liu et al., "Context Discovery Using Attenuated Bloom Filters in Ad-Hoc Networks," Springer, pp. 13-25, 2006.

First Office Action mailed Jun. 7, 2004 in Canadian Patent Application 2408819, filed May 11, 2001.

First Office Action mailed Jun. 14, 2007 in Canadian Patent Application 2475857, filed Mar. 11, 2003.

Office Action mailed Mar. 26, 2012 in German Patent Application 10392450.7, filed Mar. 28, 2003.

First Office Action mailed Nov. 5, 2008 in Canadian Patent Application 2408398, filed Mar. 27, 2003.

Second Office Action mailed Sep. 25, 2009 in Canadian Patent Application 2408398, filed Mar. 27, 2003.

First Office Action mailed Mar. 1, 2005 in European Patent Application No. 03716920.8, filed Mar. 27, 2003.

Second Office Action mailed Nov. 9, 2006 in European Patent Application No. 03716920.8, filed Mar. 27, 2003.

Third Office Action mailed Apr. 30, 2008 in European Patent Application No. 03716920.8, filed Mar. 27, 2003.

Office Action mailed Oct. 25, 2011 in Japanese Patent Application 2007-536911 filed Oct. 12, 2005.

Office Action mailed Jul. 24, 2012 in Japanese Patent Application 2007-536911 filed Oct. 12, 2005.

Final Office Action mailed Apr. 9, 2013 in Japanese Patent Application 2007-536911 filed Oct. 12, 2005.

Office Action mailed May 13, 2005 in Chinese Patent Application 1812317.1, filed May 11, 2001.

Office Action mailed Apr. 21, 2006 in Chinese Patent Application 1812317.1, filed May 11, 2001.

Office Action mailed Jul. 19, 2006 in Japanese Patent Application 2003-577155, filed Mar. 11, 2003.

Office Action mailed Mar. 1, 2007 in Chinese Patent Application 3805749.2, filed Mar. 11, 2003.

Office Action mailed Feb. 27, 2007 in Japanese Patent Application 2002-590018, filed May 13, 2002.

Office Action mailed Jan. 26, 2007 in Chinese Patent Application 3807018.9, filed Mar. 27, 2003.

Office Action mailed Dec. 7, 2005 in Indian Patent Application 2283/DELNP/2004, filed Mar. 11, 2003.

Office Action mailed Mar. 31, 2009 in European Patent Application 3714080.3, filed Mar. 11, 2003.

Agichtein et al., "Snowball: Extracting Information from Large Plain-Text Collections," ACM DL '00, the Fifth ACM Conference on Digital Libraries, Jun. 2, 2000, San Antonio, TX, USA.

Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.

Office Action mailed Aug. 29, 2006 in Japanese Patent Application 2003-581064, filed Mar. 27, 2003.

Office Action mailed Jan. 26, 2007 in Chinese Patent Application 3807027.8, filed Mar. 28, 2003.

(56) References Cited

OTHER PUBLICATIONS

Office Action mailed Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.
Agbago, A., et al., "Truecasing for the Portage System," In Recent Advances in Natural Language Processing (Borovets, Bulgaria), Sep. 21-23, 2005, pp. 21-24.
Al-Onaizan et al., "Statistical Machine Translation," 1999, JHU Summer Tech Workshop, Final Report, pp. 1-42.
Al-Onaizan et al., "Translating with Scarce Resources," 2000, 17th National Conference of the American Association for Artificial Intelligence, Austin, TX, pp. 672-678.
Al-Onaizan, Y. and Knight K., "Machine Transliteration of Names in Arabic Text,"Proceedings of ACL Workshop on Computational Approaches to Semitic Languages. Philadelphia, 2002.
Al-Onaizan, Y. and Knight, K., "Named Entity Translation: Extended Abstract", 2002, Proceedings of HLT-02, SanDiego, CA.
Al-Onaizan, Y. and Knight, K., "Translating Named Entities Using Monolingual and Bilingual Resources," 2002, Proc. of the 40th Annual Meeting of the ACL, pp. 400-408.
Alshawi et al., "Learning Dependency Translation Models as Collections of Finite-State Head Transducers," 2000, Computational Linguistics, vol. 26, pp. 45-60.
Alshawi, Hiyan, "Head Automata for Speech Translation", Proceedings of the ICSLP 96, 1996, Philadelphia, Pennsylvania.
Ambati, V., "Dependency Structure Trees in Syntax Based Machine Translation," Spring 2008 Report <http://www.cs.cmu.edu/~vamshi/publications/DependencyMT_report.pdf>, pp. 1-8.
Arbabi et al., "Algorithms for Arabic name transliteration," Mar. 1994, IBM Journal of Research and Development, vol. 38, Issue 2, pp. 183-194.
Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.
Ballesteros, L. et al., "Phrasal Translation and Query Expansion Techniques for Cross-Language Information Retrieval," SIGIR 97, Philadelphia, PA, © 1997, pp. 84-91.
Bangalore, S. and Rambow, O., "Evaluation Metrics for Generation," 2000, Proc. of the 1st International NaturalLanguage Generation Conf., vol. 14, pp. 1-8.
Bangalore, S. and Rambow, O., "Using TAGs, a Tree Model, and a Language Model for Generation," May 2000, Workshop TAG+5, Paris.
Bangalore, S. and Rambow, O., "Corpus-Based Lexical Choice in Natural Language Generation," 2000, Proc. ofthe 38th Annual ACL, Hong Kong, pp. 464-471.
"Bangalore, S. and Rambow, O., ""Exploiting a Probabilistic Hierarchical Model for Generation,""2000, Proc. of 18thconf. on Computational Linguistics, vol. 1, pp. 42-48.".
Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005), Annual Meeting of the ACL Assoc. for Computational Linguistics, Morristown, NJ, 597-604. DOI=http://dx.doi.org/10.3115/1219840.

Barnett et al., "Knowledge and Natural Language Processing," Aug. 1990, Communications of the ACM, vol. 33, Issue 8, pp. 50-71.
Baum, Leonard, "An Inequality and Associated Maximization Technique in Statistical Estimation for ProbabilisticFunctions of Markov Processes", 1972, Inequalities 3:1-8.
Berhe, G. et al., "Modeling Service-based Multimedia Content Adaptation in Pervasive Computing," CF '04 (Ischia, Italy) Apr. 14-16, 2004, pp. 60-69.
Boitet, C. et al., "Main Research Issues in Building Web Services for Mutualized, Non-Commercial Translation," Proc. Of the 6th Symposium on Natural Language Processing, Human and Computer Processing of Language and Speech, © 2005, pp. 1-11.
Brants, Thorsten, "TnT—A Statistical Part-of-Speech Tagger," 2000, Proc. of the 6th Applied Natural LanguageProcessing Conference, Seattle.
Brill, Eric, "Transformation-Based Error-Driven Learning and Natural Language Processing: A Case Study in Part of Speech Tagging", 1995, Association for Computational Linguistics, vol. 21, No. 4, pp. 1-37.
Brill, Eric. "Transformation-Based Error-Driven Learning and Natural Language Processing: A Case Study in Partof Speech Tagging", 1995, Computational Linguistics, vol. 21, No. 4, pp. 543-565.
Brown et al., "A Statistical Approach to Machine Translation," Jun. 1990, Computational Linguistics, vol. 16, No. 2, pp. 79-85.
Brown et al., "Word-Sense Disambiguation Using Statistical Methods," 1991, Proc. of 29th Annual ACL, pp. 264-270.
Brown et al., "The Mathematics of Statistical Machine Translation: Parameter Estimation," 1993, ComputationalLinguistics, vol. 19, Issue 2, pp. 263-311.
Brown, Ralf, "Automated Dictionary Extraction for "Knowledge-Free" Example-Based Translation," 1997, Proc. of 7th Int'l Cont. On Theoretical and Methodological Issues in MT, Santa Fe, NM, pp. 111-118.
Callan et al., "TREC and TIPSTER 'Experiments with INQUERY," 1994, Information Processing and Management, vol. 31, Issue 3, pp. 327-343.
Callison-Burch, C. et al., "Statistical Machine Translation with Word- and Sentence-aligned Parallel Corpora," In Proceedings of the 42nd Meeting on Assoc. For Computational Linguistics (Barcelona, Spain, Jul. 21-26, 2004) Annual Meeting of the ACL. Assoc. For Computational Linguistics, Morristown, NJ, 1.
Carl, Michael. "A Constructivist Approach to Machine Translation," 1998, New Methods of Language Processingand Computational Natural Language Learning, pp. 247-256.
Chen, K. and Chen, H., "Machine Translation: An Integrated Approach," 1995, Proc. of 6th Int'l Cont. on Theoreticaland Methodological Issue in MT, pp. 287-294.
Cheng, P. et al., "Creating Multilingual Translation Lexicons with Regional Variations Using Web Corpora," In Proceedings of the 42nd Annual Meeting on Assoc. For Computational Linguistics (Barcelona, Spain, Jul. 21-26, 2004). Annual Meeting of the ACL. Assoc. For Computational Linguistics, Morristown, NJ, 53.
Cheung et al., "Sentence Alignment in Parallel, Comparable, and Quasi-comparable Corpora", In Proceedings of LREC, 2004, pp. 30-33.
Chinchor, Nancy, "MUC-7 Named Entity Task Definition," 1997, Version 3.5.
Clarkson, P. and Rosenfeld, R., "Statistical Language Modeling Using the CMU-Cambridge Toolkit", 1997, Proc. ESCA Eurospeech, Rhodes, Greece, pp. 2707-2710.
Cohen et al., "Spectral Bloom Filters," SIGMOD 2003, Jun. 9-12, 2003, ACM pp. 241-252.
Cohen, "Hardware-Assisted Algorithm for Full-text Large-Dictionary String Matching Using n-gram Hashing," 1998, Information Processing and Management, vol. 34, No. 4, pp. 443-464.
Yossi, Cohen "Interpreter for FUF," (available at ftp:lftp.cs.bgu.ac.il/pUb/people/elhadad/fuf-life.lf) (downloaded Jun. 1, 2008).
Corston-Oliver, Simon, "Beyond String Matching and Cue Phrases: Improving Efficiency and Coverage in Discourse Analysis", 1998, The AAAI Spring Symposium on Intelligent Text Summarization, pp. 9-15.
Covington, "An Algorithm to Align Words for Historical Comparison", Computational Linguistics, 1996, vol. 22, No. 4, pp. 481-496.

(56) References Cited

OTHER PUBLICATIONS

Dagan, I. and Itai, A., "Word Sense Disambiguation Using a Second Language Monolingual Corpus", 1994, Association for Computational Linguistics, vol. 20, No. 4, pp. 563-596.
Dempster et al., "Maximum Likelihood from Incomplete Data via the EM Algorithm", 1977, Journal of the RoyalStatistical Society, vol. 39, No. 1, pp. 1-38.
Diab, M. and Finch, S., "A Statistical Word-Level Translation Model for Comparable Corpora," 2000, In Proc.of theConference on Content Based Multimedia Information Access (RIAO).
Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.
Eisner, Jason, "Learning Non-Isomorphic Tree Mappings for Machine Translation," 2003, in Proc. of the 41st Meeting of the ACL, pp. 205-208.
Elhadad et al., "Floating Constraints in Lexical Choice", 1996, ACL, vol. 23 No. 2, pp. 195-239.
Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.
Elhadad, M. and Robin, J., "Controlling Content Realization with Functional Unification Grammars", 1992, Aspects of Automated Natural Language Generation, Dale et al. (eds)., Springer Verlag, pp. 89-104.
Elhadad, Michael, "FUF: the Universal Unifier User Manual Version 5.2", 1993, Department of Computer Science, Ben Gurion University, Beer Sheva, Israel.
Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4. pp 720-727.
Kupiec, Julian, "An Algorithm for Finding Noun Phrase Correspondences in Bilingual Corpora," In Proceedings of the 31st Annual Meeting of the ACL, 1993, pp. 17-22.
Kurohashi, S. and Nagao, M., "Automatic Detection of Discourse Structure by Checking Surface Information in Sentences," 1994, Proc. of COL-LING '94, vol. 2, pp. 1123-1127.
Langkilde, I. and Knight, K., "Generation that Exploits Corpus-Based Statistical Knowledge," 1998, Proc. of the COLING-ACL, pp. 704-710.
Langkilde, I. and Knight, K., "The Practical Value of N-Grams in Generation," 1998, Proc. of the 9th International Natural Language Generation Workshop, pp. 248-255.
Langkilde, Irene, "Forest-Based Statistical Sentence Generation," 2000, Proc. of the 1st Conference on North American chapter of the ACL, Seattle, WA, pp. 170-177.
Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.
Langkilde-Geary, Irene, "An Empirical Verification of Coverage and Correctness for a General-Purpose Sentence Generator," 1998, Proc. 2nd Int'l Natural Language Generation Conference.
Lee, Yue-Shi,"Neural Network Approach to Adaptive Learning: with an Application to Chinese Homophone Disambiguation," IEEE 2001 pp. 1521-1526.
Lita, L. et al. "tRuEcasIng," 2003 Proceedings of the 41st Annual Meeting of the Assoc. for Computational Linguistics (In Hinrichs, E. and Roth, D.- editors), pp. 152-159.
Llitjos, A. F. et al., "The Translation Correction Tool: English-Spanish User Studies," Citeseer © 2004, downloaded.from: http://gs37.sp.cs.cmu.edu/ari/papers/lrec04/fontll, pp. 1-4.
Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.
Manning, C. and Schutze, H., "Foundations of Statistical Natural Language Processing," 2000, The MIT Press, Cambridge, MA [Front Matter].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.
Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.
Marcu, Daniel, "Discourse trees are good indicators of importance in text," 1999, Advances in Automatic Text Summarization, The MIT Press, Cambridge, MA.
Marcu, Daniel, "Instructions for Manually Annotating the Discourse Structures of Texts," 1999, Discourse Annotation, pp. 1-49.
Marcu, Daniel, "The Rhetorical Parsing of Natural Language Texts," 1997, Proceedings of ACLIEACL '97, pp. 96-103.
Marcu, Daniel, "The Rhetorical Parsing, Summarization, and Generation of Natural Language Texts," 1997, Ph.D. Thesis, Graduate Department of Computer Science, University of Toronto.
Marcu, Daniel, "Towards a Unified Approach to Memory- and Statistical-Based Machine Translation," 2001, Proc. of the 39th Annual Meeting of the ACL, pp. 378-385.
McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. For Computational Linguistics, Morristown, NJ, pp. 188-191.
McDevitt, K. et al., "Designing of a Community-based Translation Center," Technical Report TR-03-30, Computer Science, Virginia Tech, © 2003, pp. 1-8.
Melamed, I. Dan, "A Word-to-Word Model of Translational Equivalence," 1997, Proc. of the 35th Annual Meeting of the ACL, Madrid, Spain, pp. 490-497.
Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.
Melamed, I. Dan, "Empirical Methods for Exploiting Parallel Texts," 2001, MIT Press, Cambridge, MA [table of contents].
Meng et al.. "Generating Phonetic Cognates to Handle Named Entities in English-Chinese Cross-Language Spoken Document Retrieval," 2001, IEEE Workshop on Automatic Speech Recognition and Understanding. pp. 311-314.
Metze, F. et al., "The NESPOLE! Speech-to-Speech Translation System," Proc. Of the HLT 2002, 2nd Int'l Conf. on Human Language Technology (San Francisco, CA), © 2002, pp. 378-383.
Mikheev et al., "Named Entity Recognition without Gazeteers," 1999, Proc. of European Chapter of the ACL, Bergen, Norway, pp. 1-8.
Miike et al., "A Full-Text Retrieval System with a Dynamic Abstract Generation Function," 1994, Proceedings of SI-GIR '94, pp. 152-161.
Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.
Mohri, Mehryar, "Regular Approximation of Context Free Grammars Through Transformation", 2000, pp. 251-261, "Robustness in Language and Speech Technology", Chapter 9, Kluwer Academic Publishers.
Monasson et al., "Determining Computational Complexity from Characteristic 'Phase Transitions'," Jul. 1999, Nature Magazine, vol. 400, pp. 133-137.
Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.
Nagao, K. et al., "Semantic Annotation and Transcoding: Making Web Content More Accessible," IEEE Multimedia, vol. 8, Issue 2 Apr.-Jun. 2001, pp. 69-81.
Nederhof, M. and Satta, G., "IDL-Expressions: A Formalism for Representing and Parsing Finite Languages in Natural Language Processing," 2004, Journal of Artificial Intelligence Research, vol. 21, pp. 281-287.

(56) References Cited

OTHER PUBLICATIONS

Niessen, S. and Ney, H, "Toward Hierarchical Models for Statistical Machine Translation of Inflected Languages," 2001, Data-Driven Machine Translation Workshop, Toulouse, France, pp. 47-54.
Norvig, Peter, "Techniques for Automatic Memorization with Applications to Context-Free Parsing", Computational . Linguistics,1991, pp. 91-98, vol. 17, No. 1.
Och et al., "Improved Alignment Models for Statistical Machine Translation," 1999, Proc. of the Joint Conf. of Empirical Methods in Natural Language Processing and Very Large Corpora, pp. 20-28.
Och et al. "A Smorgasbord of Features for Statistical Machine Translation." HLTNAACL Conference. Mar. 2004, 8 pages.
Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.
Och, F. and Ney, H, "Improved Statistical Alignment Models," 2000, 38th Annual Meeting of the ACL, Hong Kong, pp. 440-447.
Och, F. and Ney, H., "Discriminative Training and Maximum Entropy Models for Statistical Machine Translation," 2002, Proc. of the 40th Annual Meeting of the ACL, Philadelphia, PA, pp. 295-302.
Och, F. and Ney, H., "A Systematic Comparison of Various Statistical Alignment Models," Computational Linguistics, 2003, 29:1, 19-51.
Papineni et al., "Bleu: a Method for Automatic Evaluation of Machine Translation," 2001, IBM Research Report, RC22176(WQ102-022).
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.
Petrov et al., "Learning Accurate, Compact and Interpretable Tree Annotation," Jun. 4-9, 2006, in Proc. of the Human Language Technology Conference of the North American Chapter of the ACL, pp. 433-440.
Pla et al., "Tagging and Chunking with Bigrams," 2000, Proc. of the 18th Conference on Computational Linguistics, vol. 2, pp. 614-620.
Qun, Liu, "A Chinese-English Machine Translation System Based on Micro-Engine Architecture," An Int'l Conference on Translation and Information Technology, Hong Kong, Dec. 2000, pp. 1-10.
Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Rayner et al.," Hybrid Language Processing in the Spoken Language Translator," IEEE 1997, pp. 107-110.
Resnik, P. and Smith, A., "The Web as a Parallel Corpus," Sep. 2003, Computational Linguistics, Special Issue on Web as Corpus, vol. 29, Issue 3, pp. 349-380.
Resnik, P. and Yarowsky, D. "A Perspective on Word Sense Disambiguation Methods and Their Evaluation," 1997, Proceedings of SIGLEX '97, Washington, D.C., pp. 79-86.
Resnik, Philip, "Mining the Web for Bilingual Text," 1999, 37th Annual Meeting of the ACL, College Park, MD, pp. 527-534.
Rich, E. and Knight, K., "Artificial Intelligence, Second Edition," 1991, McGraw-Hill Book Company [Front Matter].
Richard et al., "Visiting the Traveling Salesman Problem with Petri nets and application in the glass industry," Feb. 1996, IEEE Emerging Technologies and Factory Automation, pp. 238-242.
Robin, Jacques, "Revision-Based Generation of Natural Language Summaries Providing Historical Background: Corpus-Based Analysis, Design Implementation and Evaluation," 1994, Ph.D. Thesis, Columbia University, New York.
Rogati et al., "Resource Selection for Domain-Specific Cross-Lingual IR," ACM 2004, pp. 154-161.
Zhang, R. et al., "The NiCT-ATR Statistical Machine Translation System for the IWSLT 2006 Evaluation," submitted to IWSLT, 2006.
Russell, S. and Norvig, P., "Artificial Intelligence: A Modern Approach," 1995, Prentice-Hall, Inc., New Jersey [Front Matter].
Sang, E. and Buchholz, S., "Introduction to the CoNLL-2000 Shared Task: Chunking," 2002, Proc. Of CoNLL-2000 and LLL-2000, Lisbon, Portugal, pp. 127-132.
Schmid, H., and Schulte im Walde, S., "Robust German Noun Chunking With a Probabilistic Context-Free Grammar," 2000, Proc. of the 18th Conference on Computational Linguistics, vol. 2, pp. 726-732.
Schutze, Hinrich, "Automatic Word Sense Discrimination," 1998, Computational Linguistics, Special Issue on Word Sense Disambiguation, vol. 24, Issue 1, pp. 97-123.
Selman et al., "A New Method for Solving Hard Satisfiability Problems," 1992, Proc. of the 10th National Conference on Artificial Intelligence, San Jose, CA, pp. 440-446.
Kumar, S. and Byrne, W., "Minimum Bayes-Risk Decoding for Statistical Machine Translation." HLTNAACL Conference. Mar. 2004, 8 pages.
Shapiro, Stuart (ed.), "Encyclopedia of Artificial Intelligence, 2nd edition", vol. D 2,1992, John Wiley & Sons Inc; "Unification" article, K. Knight, pp. 1630-1637.
Shirai, S., "A Hybrid Rule and Example-based Method for Machine Translation," 1997, NTT Communication Science Laboratories, pp. 1-5.
Sobashima et al., "A Bidirectional Transfer-Driven Machine Translation System for Spoken Dialogues," 1994, Proc. of 15th Conference on Computational Linguistics, vol. 1, pp. 64-68.
Soricut et al., "Using a Large Monolingual Corpus to Improve Translation Accuracy," 2002, Lecture Notes In Computer Science, vol. 2499, Proc. of the 5th Conference of the Association for Machine Translation in the Americas on Machine Translation: From Research to Real Users, pp. 155-164.
Stalls, B. and Knight, K., "Translating Names and Technical Terms in Arabic Text," 1998, Proc. of the COLING/ACL Workkshop on Computational Approaches to Semitic Language.
Sumita et al., "A Discourse Structure Analyzer for Japanese Text," 1992, Proc. of the International Conference on Fifth Generation Computer Systems, vol. 2, pp. 1133-1140.
Sun et al., "Chinese Named Entity Identification Using Class-based Language Model," 2002, Proc. of 19th International Conference on Computational Linguistics, Taipei, Taiwan, vol. 1, pp. 1-7.
Tanaka, K. and Iwasaki, H. "Extraction of Lexical Translations from Non-Aligned Corpora," Proceedings of COLING 1996.
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. For Computational Linguistics, Morristown, NJ.
Taylor et al., "The Penn Treebank: An Overview," in A. Abeill (ed.), D Treebanks: Building and Using Parsed Corpora, 2003, pp. 5-22.
Tiedemann, Jorg, "Automatic Construction of Weighted String Similarity Measures," 1999, In Proceedings of the Joint SIGDAT Conference on Empirical Methods in Natural Language Processing and Very Large Corpora.
Tillman, C. and Xia, F., "A Phrase-Based Unigram Model for Statistical Machine Translation," 2003, Proc. of the North American Chapter of the ACL on Human Language Technology, vol. 2, pp. 106-108.
Tillmann et al., "A DP Based Search Using Monotone Alignments in Statistical Translation," 1997, Proc. of the Annual Meeting of the ACL, pp. 366-372.
Tomas, J., "Binary Feature Classification for Word Disambiguation in Statistical Machine Translation," Proceedings of the 2nd Int'l. Workshop on Pattern Recognition, 2002, pp. 1-12.
Uchimoto, K. et al., "Word Translation by Combining Example-Based Methods and Machine Learning Models," Natural Language Processing (Shizen Gengo Shori), vol. 10, No. 3, Apr. 2003, pp. 87-114.
Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).
Ueffing et al., "Generation of Word Graphs in Statistical Machine Translation," 2002, Proc. of Empirical Methods in Natural Language Processing (EMNLP), pp. 156-163.

(56) References Cited

OTHER PUBLICATIONS

Varga et al., "Parallel Corpora for Medium Density Languages", In Proceedings of RANLP 2005, pp. 590-596.

Veale, T. and Way, A., "Gaijin: A Bootstrapping, Template-Driven Approach to Example-Based MT," 1997, Proc. Of New Methods in Natural Language Processing (NEMPLP97), Sofia, Bulgaria.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Vogel, S. and Ney, H., "Construction of a Hierarchical Translation Memory," 2000, Proc. of Cooling 2000, Saarbrucken, Germany, pp. 1131-1135.

Wang, Y. and Waibel, A., "Decoding Algorithm in Statistical Machine Translation," 1996, Proc. of the 35th Annual Meeting of the ACL, pp. 366-372.

Wang, Ye-Yi, "Grammar Inference and Statistical Machine Translation," 1998, Ph.D Thesis, Carnegie Mellon University, Pittsburgh, PA.

Watanabe et al., "Statistical Machine Translation Based on Hierarchical Phrase Alignment," 2002, 9th International Conference on Theoretical and Methodological Issues in Machine Translation (TMI-2002), Keihanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-16.

Wu, Dekai, "A Polynomial-Time Algorithm for Statistical Machine Translation," 1996, Proc. of 34th Annual Meeting of the ACL, pp. 152-158.

Wu, Dekai, "Stochastic Inversion Transduction Grammars and Bilingual Parsing of Parallel Corpora," 1997, Computational Linguistics, vol. 23, Issue 3, pp. 377-403.

Yamada, K. and Knight, K. "A Syntax-Based Statistical Translation Model," 2001, Proc. of the 39th Annual Meeting of the ACL, pp. 523-530.

Yamada, K. and Knight, K., "A Decoder for Syntax-Based Statistical MT," 2001, Proceedings of the 40th Annual Meeting of the ACL, pp. 303-310.

Yamada K., "A Syntax-Based Statistical Translation Model," 2002 PhD Dissertation, pp. 1-141.

Yamamoto et al., "A Comparative Study on Translation Units for Bilingual Lexicon Extraction," 2001, Japan Academic Association for Copyright Clearance, Tokyo, Japan.

Yamamoto et al, "Acquisition of Phrase-level Bilingual Correspondence using Dependency Structure" In Proceedings of COLING-2000, pp. 933-939.

Yarowsky, David, "Unsupervised Word Sense Disambiguation Rivaling Supervised Methods," 1995, 33rd Annual Meeting of the ACL, pp. 189-196.

Zhang et al., "Synchronous Binarization for Machine Translations," Jun. 4-9, 2006, in Proc. Of the Human Language Technology Conference of the North American Chapter of the ACL, pp. 256-263.

Huang et al. "Automatic Extraction of Named Entity Translingual Equivalence Based on Multi-Feature Cost Minimization". In Proceedings of the ACL 2003 Workshop on Multilingual and Mixed-Language Name Entry Recognition.

Notice of Allowance mailed Dec. 10, 2013 in Japanese Patent Application 2007-536911, filed Oct. 12, 2005.

Makoushina, J. "Translation Quality Assurance Tools: Current State and Future Approaches." Translating and the Computer, Dec. 17, 2007, 29, 1-39, retrieved at <http://www.palex.ru/fc/98/Translation%20Quality%20Assurance%20Tools.pdf>.

Specia et al. "Improving the Confidence of Machine Translation Quality Estimates," MT Summit XII, Ottawa, Canada, 2009, 8 pages.

Soricut et al., "TrustRank: Inducing Trust in Automatic Translations via Ranking", published in Proceedings of the 48th Annual Meeting of the Association for Computational Linguistics (Jul. 2010), pp. 612-621.

U.S. non-provisional patent application U.S. Appl. No. 11/454,212, filed on Jun. 15, 2006.U.S. non-provisional patent application U.S. Appl. No. 11/454,212, filed on Jun. 15, 2006.

Editorial FreeLancer Association, Guidelines for Fees, https://web.archive.org/web/20090604130631/http://www.the-efa.org/res/code_2.php, Jun. 4, 2009, retrieved Aug. 9, 2014.

Wasnak, L., "Beyond the Basics: How Much Should I Charge", https://web.archive.org/web/20070121231531/http://www.writersmarket.com/assets/pdf/How_Much_Should_1_Charge.pdf, Jan. 21, 2007, retrieved Aug. 19, 2014.

Summons to Attend Oral Proceedings mailed Sep. 18, 2014 in German Patent Application 10392450.7, filed Mar. 28, 2003.

Examination Report mailed Jul. 22, 2013 in German Patent Application 112005002534.9, filed Oct. 12, 2005.

Elhadad, Michael, "Using Argumentation to Control Lexical Choice: A Functional Unification Implementation", 1992, Ph.D. Thesis, Graduate School of Arts and Sciences, Columbia University.

Elhadad, M. and Robin, J., "SURGE: a Comprehensive Plug-in Syntactic Realization Component for Text Generation", 1999 (available at http://www.cs.bgu.ac.il/-elhadad/pub.html).

Fleming, Michael et al., "Mixed-Initiative Translation of Web Pages,"AMTA 2000, LNAI 1934, Springer-Verlag, Berlin, Germany, 2000, pp. 25-29.

Och, Franz Josef and Ney, Hermann, "Improved Statistical Alignment Models" ACLOO:PROC. OF THE 38TH. ANNUAL MEETING OF THE ASSOCIATION FOR COMPUTATIONAL LINGUSTICS, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps>, retrieved on May 6, 2004, abstract.

Ren, Fuji and Shi, Hongchi, "Parallel Machine Translation: Principles and Practice," Engineering of Complex Computer Systems, 2001 Proceedings, Seventh IEEE Int'l Conference, pp. 249-259, 2001.

Fung et al, "Mining Very-Non-Parallel Corpora: Parallel Sentence and Lexicon Extraction via Bootstrapping and EM", In EMNLP 2004.

Fung, P. and Yee, L., "An IR Approach for Translating New Words from Nonparallel, Comparable Texts", 1998,36th Annual Meeting of the ACL, 17th International Conference on Computational Linguistics, pp. 414-420.

Fung, Pascale, "Compiling Bilingual Lexicon Entries From a Non-Parallel English-Chinese Corpus", 1995, Proc., of the Third Workshop on Very Large Corpora, Boston, MA, pp. 173-183.

Gale, W. and Church, K., "A Program for Aligning Sentences in Bilingual Corpora," 1991, 29th Annual Meeting ofthe ACL, pp. 177-183.

Gale, W. and Church, K., "A Program for Aligning Sentences in Bilingual Corpora," 1993, Computational Linguistics, vol. 19, No. 1, pp. 75-102.

Galley et al., "Scalable Inference and Training of Context-Rich Syntactic Translation Models," Jul. 2006, in Proc. Of the 21st International Conference on Computational Linguistics, pp. 961-968.

Galley et al., "What's in a translation rule?", 2004, in Proc. Of HLT/NAACL '04, pp. 1-8.

Gaussier et al, "A Geometric View on Bilingual Lexicon Extraction from Comparable Corpora", In Proceedings of ACL 2004, Jul.

Germann et al., "Fast Decoding and Optimal Decoding for Machine Translation", 2001, Proc. of the 39th AnnualMeeting of the ACL, Toulouse, France, pp. 228-235.

Germann, Ulrich: "Building a Statistical Machine Translation System from Scratch: How Much Bang for theBuck Can We Expect?" Proc. of the Data-Driven MT Workshop of ACL-01, Toulouse, France, 2001.

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003).

(56) References Cited

OTHER PUBLICATIONS

Annual Meeting of the ACL Assoc. for Computational Linguistics, Morristown, NJ, 80-87. DOI=http://dx.doi.org/10.3115/1075096.1075107.
Grefenstette, Gregory, "The World Wide Web as a Resource for Example-Based Machine Translation Tasks", 1999, Translating and the Computer 21, Proc. of the 21 st International Conf. on Translating and theComputer. London, UK, 12 pp.
Grossi et al, "Suffix Trees and Their Applications in String Algorithms", In. Proceedings of the 1st South American Workshop on String Processing, Sep. 1993, pp. 57-76.
Gupta et al., "Kelips: Building an Efficient and Stable P2P DHT thorough Increased Memory and Background Overhead," 2003 IPTPS, LNCS 2735, pp. 160-169.
Habash, Nizar, "The Use of a Structural N-gram Language Model in Generation-Heavy Hybrid Machine Translation," University of Maryland, Univ. Institute for Advance Computer Studies, Sep. 8, 2004.
Hatzivassiloglou, V. et al., "Unification-Based Glossing", 1995, Proc. of the International Joint Conference onArtificial Intelligence, pp. 1382-1389.
Huang et al., "Relabeling Syntax Trees to Improve Syntax-Based Machine Translation Quality," Jun. 4-9 2006, in Proc. of the Human Language Technology Conference of the North American Chapter of the ACL, pp. 240-247.
Ide, N. and Veronis, J., "Introduction to the Special Issue on Word Sense Disambiguation: The State of the Art", Mar. 1998, Computational Linguistics, vol. 24, Issue 1, pp. 2-40.
Bikel, D., Schwartz, R., and Weischedei, R., "An Algorithm that Learns What's in a Name," Machine Learning 34, 211-231 (1999).
Imamura et al., "Feedback Cleaning of Machine Translation Rules Using Automatic Evaluation," 2003 Computational Linguistics, pp. 447-454.
Imamura, Kenji, "Hierarchical Phrase Alignment Harmonized with Parsing", 2001, in Proc. of NLPRS, Tokyo.
Jelinek, F., "Fast Sequential Decoding Algorithm Using a Stack", Nov. 1969, IBM J. Res. Develop., vol. 13, No. 6, pp. 675-685.
Jones, K. Sparck, "Experiments in Relevance Weighting of Search Terms", 1979, Information Processing & Management, vol. 15, Pergamon Press Ltd., UK, pp. 133-144.
Klein et al., "Accurate Unlexicalized Parsing," Jul. 2003, in Proc. of the 41st Annual Meeting of the ACL, pp. 423-430.
Knight et al., "Integrating Knowledge Bases and Statistics in MT," 1994, Proc. of the Conference of the Association for Machine Translation in the Americas.
Knight et al., "Filling Knowledge Gaps in a Broad-Coverage Machine Translation System", 1995, Proc. Of the 14th International Joint Conference on Artificial Intelligence, Montreal, Canada, vol. 2, pp. 1390-1396.
Knight, K. and Al-Onaizan, Y., "A Primer on Finite-State Software for Natural Language Processing", 1999 (available at http://www.isLedullicensed-sw/carmel).
Knight, K. and Al-Onaizan, Y., "Translation with Finite-State Devices," Proceedings of the 4th AMTA Conference, 1998.
Knight, K. and Chander, I., "Automated Postediting of Documents,"1994, Proc. of the 12th Conference on Artificial Intelligence, pp. 779-784.
Knight, K. and Graehl, J., "Machine Transliteration", 1997, Proc. of the ACL-97, Madrid, Spain, pp. 128-135.
Knight, K. and Hatzivassiloglou, V., "Two-Level, Many-Paths Generation," 1995, Proc. of the 33rd Annual Conference of the ACL, pp. 252-260.
Knight, K. and Luk, S., "Building a Large-Scale Knowledge Base for Machine Translation," 1994, Proc. of the 12th Conference on Artificial Intelligence, pp. 773-778.
Knight, K. and Marcu, D., "Statistics-Based Summarization—Step One: Sentence Compression," 2000, American Association for Artificial Intelligence Conference, pp. 703-710.
Knight, K. and Yamada, K., "A Computational Approach to Deciphering Unknown Scripts," 1999, Proc. of the ACL Workshop on Unsupervised Learning in Natural Language Processing.
Knight, Kevin, "A Statistical MT Tutorial Workbook," 1999, JHU Summer Workshop (available at http://www.isLedu/natural-language/mUwkbk.rtf).
Knight, Kevin, "Automating Knowledge Acquisition for Machine Translation," 1997, AI Magazine, vol. 18, No. 4.
Knight, Kevin, "Connectionist Ideas and Algorithms," Nov. 1990, Communications of the ACM, vol. 33, No. 11, pp. 59-74.
Knight, Kevin, "Decoding Complexity in Word-Replacement Translation Models", 1999, Computational Linguistics, vol. 25, No. 4.
Knight, Kevin, "Integrating Knowledge Acquisition and Language Acquisition", May 1992, Journal of Applied Intelligence, vol. 1, No. 4.
Knight, Kevin, "Learning Word Meanings by Instruction," 1996, Proc. of the D National Conference on Artificial Intelligence, vol. 1, pp. 447-454.
Knight, Kevin, "Unification: A Multidisciplinary Survey," 1989, ACM Computing Surveys, vol. 21, No. 1.
Koehn, Philipp, "Noun Phrase Translation," A PhD Dissertation for the University of Southern California, pp. xiii, 23, 25-57, 72-81, Dec. 2003.
Koehn, P. and Knight, K., "ChunkMT: Statistical Machine Translation with Richer Linguistic Knowledge," Apr. 2002, Information Sciences Institution.
Koehn, P. and Knight, K., "Estimating Word Translation Probabilities from Unrelated Monolingual Corpora Using the EM Algorithm," 2000, Proc. of the 17th meeting of the AAAI.
Koehn, P. and Knight, K., "Knowledge Sources for Word-Level Translation Models," 2001, Conference on Empirical Methods in Natural Language Processing.
Leusch et al.. , "A Novel String-to-String Distance Measure with Applications to Machine Translation Evaluation", 2003, https://www-i6.informatik.rwth-aachen.de, pp. 1-8.
Oflazer, Kemal., "Error-tolerant Finite-state Recognition with Application to Morphological Analysis and Spelling Correction", 1996, https://www.ucrel.lancs.ac.uk, pp. 1-18.
Snover et al., "A Study of Translation Edit Rate with Targeted Human Annotation", 2006, https://www.cs.umd.edu/~snover/pub/amta06/ter_amta.pdf, pp. 1-9.
Levenshtein, V.I., "Binary Codes Capable of Correcting Deletions, Insertions, and Reversals", 1966, Doklady Akademii Nauk SSSR, vol. 163, No. 4, pp. 707-710.
Kumar, Shankar, "Minimum Bayes-Risk Techniques in Automatic Speech Recognition and Statistical Machine Translation: A dissertation submitted to the Johns Hopkins University in conformity with the requirements for the degree of Doctor of Philosophy," Baltimore, MD Oct. 2004.

\* cited by examiner

| Source | MT | Correction | Comment |
|---|---|---|---|
| it's gonna be alright | esto va a ser bien | esto va a estar bien | Useful. Fixes verb. |
| I'm writing to tell you about the party last night | Escribo para decirle sobre el partido anoche | Escribo para decirle sobre la fiesta de anoche | Useful. Fixes bad translation of "party" |
| goat's milk | la leche de la cabra | leche de la paja | Not Useful. Original was correct, this is not. |
| bobby always does his homework | Bobby siempre hace su tarea | hacerme caca | Not Useful. Non-responsive |

FIG. 2A

| Language Pair | Data Size (entries) | % Useful |
|---|---|---|
| English->Spanish | 245 | 60.0 |
| English->French | 569 | 63.4 |

FIG. 2B

PERSONALIZED MACHINE TRANSLATION VIA ONLINE ADAPTATION

FIELD OF THE PRESENT TECHNOLOGY

The present technology relates generally to machine translation methodologies and systems, and more specifically, but not by way of limitation, to personalized machine translation via online adaptation, where translator feedback regarding machine translations may be intelligently evaluated and incorporated back into the translation methodology utilized by a machine translation system to improve and/or personalize the translations produced by the machine translation system.

BACKGROUND

The quality of translations produced by machine translation systems often depends upon the quality of the translation methodologies utilized by the machine translation systems. Commonly utilized translation methodologies may comprise language models, translation memories, parallel corpora, translation dictionaries, phrase tables, and so forth. Additionally, translations produced by machine translation systems may be improved by adding new information to the translation methodologies utilized by the machine translation systems. The present technology contemplates utilizing translator feedback regarding machine translations to improve and/or personalize the translations produced by these machine translation systems.

SUMMARY OF THE PRESENT TECHNOLOGY

According to some embodiments, the present technology may be directed to methods for managing a personalized machine translation system. These methods may comprise: (a) receiving translator feedback regarding machine translations generated by a machine translation system for a translator, the machine translation system using a translation methodology; (b) determining translator feedback that improves translations generated by the machine translation system; and (c) incorporating the determined translator feedback into the translation methodology of the machine translation system to personalize the translation methodology.

According to other embodiments, the present technology may be directed to personalized machine translation systems. These systems may comprise: (a) a feedback processor that receives translator feedback regarding machine translations generated by a machine translation system for a translator, the machine translation system using a translation methodology; (b) a feedback classifier that determines translator feedback that improves translations generated by the machine translation system; and (c) a dictionary pusher that incorporates the translator feedback into the translation methodology of the machine translation system to personalize the translation methodology.

According to additional embodiments, the present technology may be directed to methods for managing a personalized machine translation system. These methods may comprise: (a) receiving translator feedback regarding machine translations generated by a machine translation system for a translator, the machine translation system using a translation methodology; (b) determining translator feedback that improves translations generated by the machine translation system; (c) determining one or more translation preferences for the translator; and (d) incorporating the determined translator feedback and the translation preferences into the translation methodology of the machine translation system to personalize the translation methodology.

According to some embodiments, a method may comprise: (a) generating a personalized translation of a target sentence using a language model, the language model used to determine a likelihood that a target sentence is grammatically well-formed, independent of translation quality; (b) receiving a feedback-adjusted translation for the language model translation; and (c) incorporating the feedback-adjusted translation into a training corpus.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 2A is a table of exemplary translation feedback sets.

FIG. 2B is a table of exemplary annotated feedback entries categorized for usefulness.

DETAILED DESCRIPTION OF EXEMPLARY EMBODIMENTS

Figure 1:
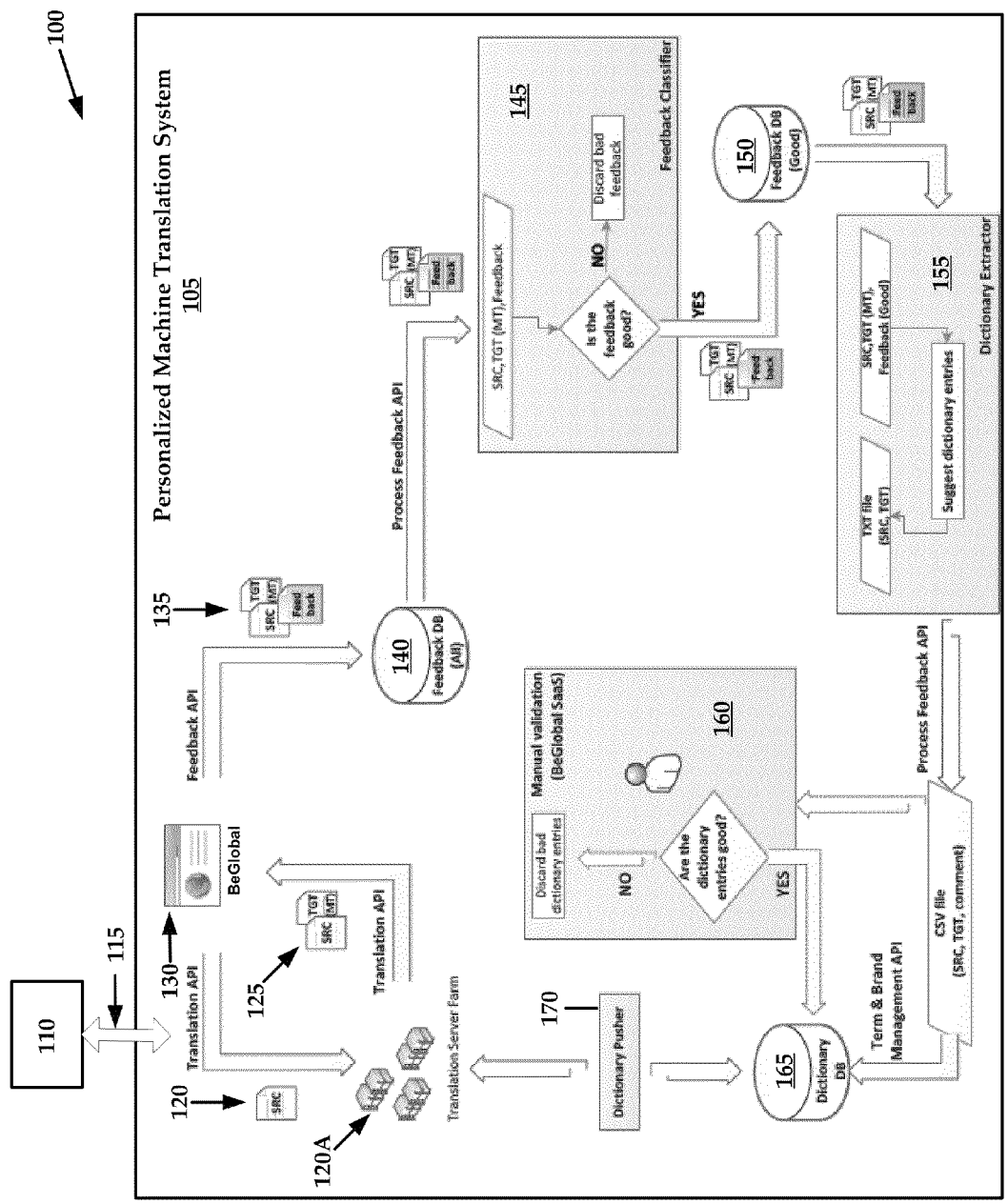
FIG. 1 illustrates an exemplary architecture for practicing aspects of the present technology, the exemplary architecture including an exemplary machine translation personalization system.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be directed, in some embodiments, to personalized machine translation via online adaptation. More specifically, but not by way of limitation, the present technology may comprise machine translation systems that receive and process translator feedback regarding machine translations. It will be understood that the machine translation system may utilize one or more types of translation methodologies to translate a source text in a source language into one or more target languages.

These and other advantages of the present technology will be described in greater detail below with reference to the collective drawings (e.g., FIGS. 1-6).

FIG. 1 illustrates an exemplary architecture 100 for practicing aspects of the present technology. According to some embodiments, the exemplary architecture 100, hereinafter "architecture 100," may generally include a personalized machine translation system, hereinafter "system 105." Translators or other end users may interact with the system 105 using a client device 110. In other embodiments, translators may interact with the system 105 via a web based interface, or an application resident on the client device 110.

The client device 110 and the system 105 may be communicatively coupled via a network 115. It is noteworthy to mention that the network 115 may include any one (or combination) of private or public communications networks such as the Internet. Additionally, various components of the system 105 may be communicatively coupled together via the network 115, where network connections of system 105 are shown in FIG. 1 as flow arrows between components.

According to some embodiments, individual components of the system 105 such as feedback classifier 145, dictionary extractor 155, and dictionary pusher 170 (or the entire system 105) may be implemented within a cloud-based computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

Generally speaking, a source text 120 in a source language may be received from a translator using the client device 110. In some instances, the client device 110 may utilize a translation API for providing source texts to the system 105 and receiving machine translations therefrom. Translations of the source text 120 may be generated by a machine translation system, also referred to as a translation server farm 120A.

As would be known to one of ordinary skill in the art, the translation server farm 120A may comprise any, or a number of, machine translation systems that employ any number of translation methodologies. Broadly speaking, a translation methodology may be described as any method, process, algorithm, or combination that allows the translation server farm 120A to translate a source text in a source language to a target text in one or more target languages. Exemplary translation methodologies may comprise corpus-based machine translation, rule-based machine translation, transfer-based machine translation, hybrid-based machine translation, statistic-based machine translation, a translation memory, a language model, a translation dictionary, a phrase table, or any combinations or permutations thereof.

According to some embodiments, the translation server farm 120A may utilize a baseline translation methodology that comprises a translation model that utilizes source phrases to generate target translations that are contextually and syntactically relevant. Additionally, the translation methodology may comprise a language model that predicts how likely a particular target translation is to be correct. The translation methodology may utilize translation dictionaries (e.g., phrase tables) and weight vectors that weight each of the translation information generated by the language and translation models, as well as the translation dictionaries. Translator feedback may be utilized to improve the language model, translation model, and/or the translation dictionaries of the translation methodology. The personalization and/or updating of translation dictionaries will be discussed in greater detail below.

Once the translation for the source text 120 has been generated, a source and translation text pair 125 may be provided back to the client device 110 via the translation API. In other instances, the source and translation text pair 125 may be provided to a review environment 130. The review environment 130 may comprise a web-based feedback input system that receives translator feedback 135 from the client device 110. According to some embodiments, translation preferences may also be received using the review environment 130. In some instances, translators may input various translation preferences, such as translator domain. A translator domain may include a reference that may be utilized to guide or affect translations. For example, if the translator works in the financial services industry, the domain for the translator may be "financial services." Thus, when the machine translation system encounters the word "bank" in a source text, the machine translation system may default to translating "bank" into a corresponding term in the target language, rather than the "bank" of a river, for example. The domain for the translator may be specified by the translator or may be inferred from an analysis of the subject matter or topics included in the source texts provided by the translator.

The translator feedback 135 may comprise any number of different types of information that reflect the translator's response to a translation generated by the translation server farm 120A. The translator's response may comprise, for example, an accuracy rating, corrections for the translation, and/or open-ended commentary, as well as other translation related feedback that would be known to one of ordinary skill in the art with the present disclosure before them. In some instances, the translator feedback 135 may comprise linguistic and qualitative annotations that support translation modeling and feedback research.

According to some embodiments, translator feedback 135 may comprise a triple that comprises a source unit, a translation unit, and a feedback unit. These various units may, in turn, be comprised of segments such as words, phrases, sentences, paragraphs, and so forth. In practice, the source unit may comprise a source word, the target translation unit may comprise a target translation word, and the feedback unit may comprise an accuracy rating for the translated word.

In other instances, the source unit may comprise multiple words or a phrase. The translation unit may comprise a translation of these words or phrases into a target language. Correspondingly, the feedback unit may comprise corrections for the target unit. For example, corrections may include the number of transformations, changes, edits, or other modifications that had to be performed on the translation unit to make it acceptable to the translator.

Exemplary translator feedback is shown in FIG. 2A in table format. The table 200 includes a plurality of translator feedback groups, such as group 205, which are arranged onto the table 200. The table 200 may comprise a series of columns that correspond to units of the feedback groups. For example, the table 200 may comprise a source unit column 210, a translation unit column 215, a correction unit column 220, and an optional commentary unit column 225.

The review environment 130 may then provide translator feedback 135 to a feedback data store 140. At this stage, the translator feedback 135 may comprise raw or noisy translation feedback, meaning that the translation feedback has not been processed to determine if the translation feedback is understandable, useable, actionable, or otherwise available for processing and/or incorporation by the system 105.

Using a process feedback API, the feedback classifier 145 may receive the translator feedback 135 from the feedback data store 140. Generally speaking, the feedback classifier 145 may be utilized to separate useful feedback from useless feedback. Again, a "useful" feedback entry is defined as one where the correction may be utilized to produce a better translation of the source text than translation generated by the machine translation system. Any other feedback content, such as a correction that makes the translation worse, commentary, junk, or badly formed data, may be classified by the feedback classifier as "not useful" and may be discarded or ignored by the feedback classifier 145.

FIG. 2B is a table 230 that includes exemplary annotated feedback entries categorized for usefulness. In some instances, translator feedback may be evaluated by human linguistic experts who annotate the translator feedback as either useful or non-useful.

Rather than using linguistic experts, the feedback classifier 145 may analyze the translator feedback using one or more surface classes of information to determine the "usefulness" of the translator feedback 135. Exemplary surface classes may comprise evaluations of: (1) a (word|character) Levenshtein distance between correction and translation, divided by translation length; (2) the correction/translation word overlap, divided by translation length; (3) translation words not included in a correction, divided by translation length; (4) correction words not included in the translation, divided by correction length; (5) (translation|correction)/source word overlap, divided by source length; (6) the length of (source|translation|correction); (7) the length of (translation|correction) divided by length of source; (8) (average|maximum) length of (source|translation|correction) word; (9) (average|maximum) length of (translation|correction) word, divided by (average|maximum) source word length; (10) (average|maximum) length of translation unit, divided by (average|maximum) correction word length; (11) determining if (correction|source) are included in the same string.

According to additional embodiments, the feedback classifier 145 may utilize back-translation (BT) features to determine the "usefulness" of the translator feedback 135. Generally speaking, the back-translation of translator feedback may be calculated by first generating translation-bt and correction-bt, the result of translating the translation or, respectively, the correction, back into the source language. It will be understood that extraction of BT features by the feedback classifier 145 may rely on the creation of back-translations of translated and corrected sentences.

Exemplary BT features may comprise: (1) (word|character) Levenshtein distance between (translation-bt|correction-bt) and the source segment; (2) (word|character) Levenshtein distance between translation-bt and correction-bt; (3) (translation-bt|correction-bt)/source word overlap, divided by source segment length; and (4) (translation-bt|correction-bt) words not in source, divided by translation-bt length.

Figure 3A:
FIG. 3A is a table of best scoring precision and accuracy values calculated for useful translation feedback.

FIG. 3A includes a table 300 that includes precision (Prec) values, which includes percentages of sentences classified that were classified as useful that actually generated an improved translation. The table 300 also includes accuracy (Acc) values, which represents percentages of translator feedback samples that were classified correctly, and recall (Rec) values, which represents percentages of useful sentences that have been categorized. As can be seen, Prec, Acc, and Rec values are calculated for both surface features and BT features. These values may also be calculated for the baseline machine translation system (e.g., machine translation system that does not utilize translator feedback).

In some instances, useful feedback may be stored in a second feedback data store 150 that is communicatively coupled with the feedback classifier and a dictionary extractor 155.

After translator feedback has been determined to be useful by the feedback classifier 145, the dictionary extractor 155 may be utilized to determine dictionary entries from the feedback. In some embodiments, the dictionary entries may include sub-sentential segments. The dictionary extractor 155 may locate phrase pairs that are implied by the feedback entries to be missing from or insufficiently weighted in a phrase table utilized by the machine translation system, such as the translation server farm 120A.

The dictionary extractor 155 may extract dictionary entries from a corpus of translator feedback triples (e.g., source unit, translation unit, correction unit). According to some embodiments, the dictionary extractor 155 may construct a first translation table and a second translation table. Generally speaking, the first translation table may comprise bitext pairs of source units and correction units. The dictionary extractor 155 may extract dictionary entries from the translator feedback by preparing the bitext pairs for alignment, aligning the words included in the bitext pairs, and extracting first phrase pairs based upon word alignment.

Next, the dictionary extractor 155 may construct a second translation table that comprises first pairs of source units and translation units. The dictionary extractor 155 may extract dictionary entries from the translator feedback by again preparing the bitext pairs for alignment, aligning the words included in the bitext pairs, and extracting second phrase pairs based upon word alignment.

According to some embodiments, the dictionary extractor 155 may prepare bitext pairs for alignment by segmenting words, tokenizing the segments, decapitalizing both sides of the bitext pairs, or any combinations thereof. Next, the dictionary extractor 155 may align the words in the bitext pairs using, for example, GIZA++ commercially available from International Business Machines, Inc.

In some embodiments, the dictionary extractor 155 may extract phrase pairs from the bitext pairs that are consistent with the alignments and subject to typical restrictions such as phrase length, unaligned word restrictions, and so forth, which will be described in greater detail below.

The dictionary extractor 155 may identify phrase pairs from the first and second translation tables that are likely good dictionary corrections, subject to the following exemplary restrictions. One exemplary restriction specifies that only phrase pairs with three or more words in either phrase will be considered by the dictionary extractor 155. Another exemplary restriction specifies that only phrase pairs with terminal words aligned will be considered by the dictionary extractor 155. Exemplary restrictions specify that for considered phrase pairs, for a given source side, if the (source, translation) and (source, correction) phrase tables do not share a target side, and the (source, correction) table has exactly one target side for that source, the phrase from the (source, correction) table is taken as an entry.

In an exemplary use case, the aforementioned methods were utilized by the dictionary extractor 155 to extract dictionary entries from the filtered noisy translator feedback acquired by the feedback classifier 145. Following the methodology described above, the feedback classifier 145 was trained on 814 English->Spanish and English->French annotated feedback entries, using baseline and back-translation features. The feedback classifier 145 was utilized to process 2,382 English->Spanish entries containing correction feedback, which captured by the feedback API and/or the review environment 130.

The feedback classifier 145 filtered 1,749 of the entries as "Useful." From those entries a dictionary was constructed by the dictionary extractor 155, as described above. The dictionary contained approximately 10,286 entries. By way of contrast a dictionary having 10,677 entries was also constructed from the entire unfiltered 2,382-entry set, to determine the effects of filtering on dictionary quality.

Figure 3B:
FIG. 3B is a table that illustrates a variety of metrics for filtered versus unfiltered feedback.

FIG. 3B includes a table 305 that comprises a comparison the translation accuracy produced by a machine translation system using a dictionary-free baseline, as well as exemplary machine translation system that utilize various dictionaries. An original-source test set was used. Also included is an average mixed-case BLEU on two references. The table also includes percentages of phrases used in the dictionary-enhanced translations that come from the dictionary, and the percent of the dictionary entries that are good-quality, which were judged by human linguistic experts 160 who annotated randomly sampled entries.

Figure 3C:
FIG. 3C is a table that includes a variety of metrics for determining dictionary entries for a baseline machine translation versus dictionary entries as affected by clean feedback.

FIG. 3C is a table 310 that shows the effects of using these entries on single-reference, mixed-case bilingual evaluation understudy (BLEU) values for various machine translations (using baseline and dictionary-enhanced machine translation). The basis for table 310 assumes that good-quality dictionary entries and translations are available to the machine translation system. Extractions for a corpus of 3,000 feedback entries in the English->Spanish technical manual domain that were professionally corrected were analyzed. The extractions were generated by repeating the dictionary extraction methods described above. Using the above-described methodology, 43,481 entries were extracted from the feedback. An exemplary held-out test corpus of 2,839 sentences was processed using both baseline and machine translation methodologies that were enhanced with the dictionary.

According to some embodiments, the dictionary extractor 155 may be configured to store selected first and second phrase pairs in a translation phrase table that resides on a data repository, such as the dictionary data store 165.

Once the dictionary entries have been extracted from the translator feedback 135, the system 105 may optionally provide the dictionary entries to human linguistic experts 160 for validation. Validated dictionary entries may be stored in a dictionary data store 165. In other embodiments, dictionary entries may be stored in the dictionary data store 165 without validation.

Next, a dictionary pusher 170 may provide the validated and/or non-validated dictionary entries to the translation server farm 120A. In some instances, the dictionary pusher may incorporate, integrate or otherwise combine the dictionary entries into the translation methodology utilized by the translation server farm 120A.

In addition to updating the translation methodology with the information extracted by the dictionary extractor 155, the dictionary pusher 170 may also provide the translation server farm 120A with translator preferences that may be utilized to further personalize the machine translations generated by the translation server farm 120A.

While the process illustrated in FIG. 1 contemplates the processing of useful translator feedback by extracting dictionary entries that may be incorporated into a phrase table (e.g., translation methodology), one of ordinary skill in the art will appreciate that translator feedback may be processed into other types of useable data that may be incorporated into translation methodologies other than phrase tables, such as parallel corpora, translation memories, as well as other translation methodologies.

The machine translation systems of the system 105 may process translator feedback regarding these machine translations and filter the translator feedback for usefulness. In accordance with the present disclosure, the "usefulness" of translator feedback may be determined by the system 105 evaluating whether the feedback, when incorporated into the translation methodology utilized by the machine translation system, produces superior machine translations as compared to machine translations systems that do not incorporate such feedback. The system 105 may produce a translation that is more accurate (e.g., a translation that required fewer manipulations or corrections). Additionally, the system 105 may personalize machine translations by gathering knowledge about the translation preferences of translators, such as common corrections, translator domains, and so forth and applying the translation preferences to machine translations generated for a particular translator.

According to some embodiments, the system 105 may utilize translation model (TM)-based personalization. The goal of TM-based personalization is similar to that of dictionary-based personalization (e.g., using a parallel corpus), to increase coverage of the translation model in response to correction feedback. While a dictionary-based approach may be executed efficiently, these approaches may not take into account a context of the translations it handles. That is, dictionary-based personalization may find source phrases that it has entries for and replace them with memorized target phrases.

Statistical MT in general may be seen as a context-aware methodology that combines learned phrase pairs together to form a translation. TM-based personalization uses feedback to learn new phrase pairs and then includes them with previously learned phrase pairs in an extant statistical MT system.

Similarly to dictionary-based personalization, a TM-based personalization method used by the system 105 may extract phrases from source and correction sentence pairs by inducing a word alignment between the elements of the pairs, for example, by using an unsupervised technique, such as GIZA++, and a sufficiently large corpus of pairs.

A standard phrase pair extraction methodology may be utilized to obtain sub-sentential phrase pairs that are consistent with the alignment and various externally imposed restrictions such as phrase length and treatment of unaligned words. Since the purpose of TM-based personalization is to expand coverage, TM-based personalization may be concerned with those phrase pairs that are not already in the phrase table.

TM-based personalization methods described above are similar to those used for dictionary-based personalization. Additionally, feedback-based phrase pairs may be incorporated into an extant phrase pair database by establishing features for the phrase pairs. A feature is a property of a phrase pair that provides some indication of the pair's utility. Some examples of features are "observed likelihood of target words given source" and "length of target phrase". Each phrase pair has numeric values for each feature. The feature values for a phrase pair are combined together to give a total score for the phrase pair, which indicates how "good" the pair according to the current translation model.

Features whose values can be determined from the phrase pair text itself (e.g., "length of target phrase") are easy to calculate for these new phrase pairs, but features based on statistics databases (e.g., "observed likelihood of target words given source") may be more difficult to calculate due to the lack of appropriate statistics (e.g., the source and target words may not have been observed together sufficiently frequently to obtain an accurate likelihood). For such features the system 105 may simulate appropriate statistics by using either accumulated statistics for low-frequency words or established default values.

Having determined the new phrase pairs, the new phrase pairs may be incorporated into the extant phrase table and a statistical MT may be performed by the system 105 as described above.

In some instances, the system 105 may utilize tuning-based personalization. As mentioned above the score of a phrase pair may be determined by combining its feature values together. According to some embodiments, the "combining" may be performed as follows: For each feature, a numeric weight (which may be positive, negative, or zero) may be determined that indicates the usefulness of the feature relative to determining a phrase pair's overall quality. A positive weight indicates a high feature value (feature values are always zero or positive), which corresponds to high quality. A negative weight means a high feature value, which corresponds to low quality. A zero weight means a feature has no effect on quality. The score of a phrase pair is determined by summing the product of each feature value with its corresponding weight. As an example, let there be three features: A, B, and C. Let the weights for each feature be, respectively, $W_A=2$, $W_B=1$, and $W_C=-3$. For a given phrase pair x, let the feature values be, respectively, FxA=5, FxB=3, and FxC=2. Then the score of x, sX, is $W_A F^X A + W_B F^X B + W_C F^X C = 10+3+(-6)=7$.

According to some embodiments, weights within an exemplary MT system may be determined by iteratively generating a large number of possible translations of a corpus of sentences (called the tuning corpus), determining the weights that enable the highest scoring translations to correspond to the highest possible extrinsic evaluations of those translations (e.g., via the BLEU metric). Additionally, the system 105 may use the calculated weights to generate more translations, until no further gains can be made. This iterative procedure is called tuning. Another commonly used approach to tuning, which differs only in the optimization algorithm used, is the Minimum Error Rate Training ("MERT") approach.

In some embodiments, the system 105 may utilize feedback as a tuning corpus. Careful selection of a tuning corpus may be utilized to obtain good MT performance. Any tuning corpus should have broad coverage of words and grammar and thus come from a "general" domain. However, if it is known that translation may be skewed toward a particular other domain, performance can be improved by including in-domain sentences in the tuning corpus, in addition to the established general domain set. Since personalization may be viewed as a domain adaptation problem, the present technology may consider the (source, correction) pairs as a domain-specific set and append them to our tuning corpus. The system 105 may then use an established tuning methodology, such as those described above. These methods may be performed iteratively, by incorporating feedback pairs into the tuning set, choosing new weights, using those new weights to generate responses to more translation requests, and then collecting yet more feedback pairs, until it is judged that no additional benefit is gained.

The system 105 may also utilize feedback as tunable feature. In some instances, statistics may be collected based on feedback. Tuning features may be derived from those statistics. For example, the system 105 may be used to calculate a statistic that represents the likelihood that a phrase pair is "licensed" by the feedback. A phrase pair may be "licensed" if it is used both in the original machine translation of a sentence and in the correction of that sentence. This statistic is calculated from a (source, translation, correction) corpus and the new feature may then be used when tuning in order to determine a weight for it. Intuitively, licensed phrase pairs may be favored over unlicensed phrase pairs.

In some instances, the system 105 may employ language model (LM)-based personalization. It is noteworthy that an information source usable in MT is a language model (LM) of the target language. An LM provides a likelihood that a target sentence is well-formed, independent of its translation quality. Some MT systems use very large language models, constructed from general-domain language. These MT systems produce good quality translation results. However, a system that incorporates domain specific language models can improve performance if it is known that translation will be in a specific domain. Thus, the system 105 may consider personalization as a form of domain adaptation, and use given corrections as sentences in a target domain. From these sentences a small, domain-specific LM may be generated and used as an additional information source in translation.

Additionally, the system 105 may modify individual probabilities in the existing LM to correspond to differences between the automatically translated and feedback-adjusted corpora. Probabilities in a LM are generally expressed as the conditional likelihood of a word given a fixed number of words observed before it. If, for example, the phrase "fired the big guns" is observed to be frequently corrected to "fired the big cannons" then we adjust the likelihood of "guns" given "fired the big" lower and that of "cannons" given "fired the big" higher.

Figure 4:
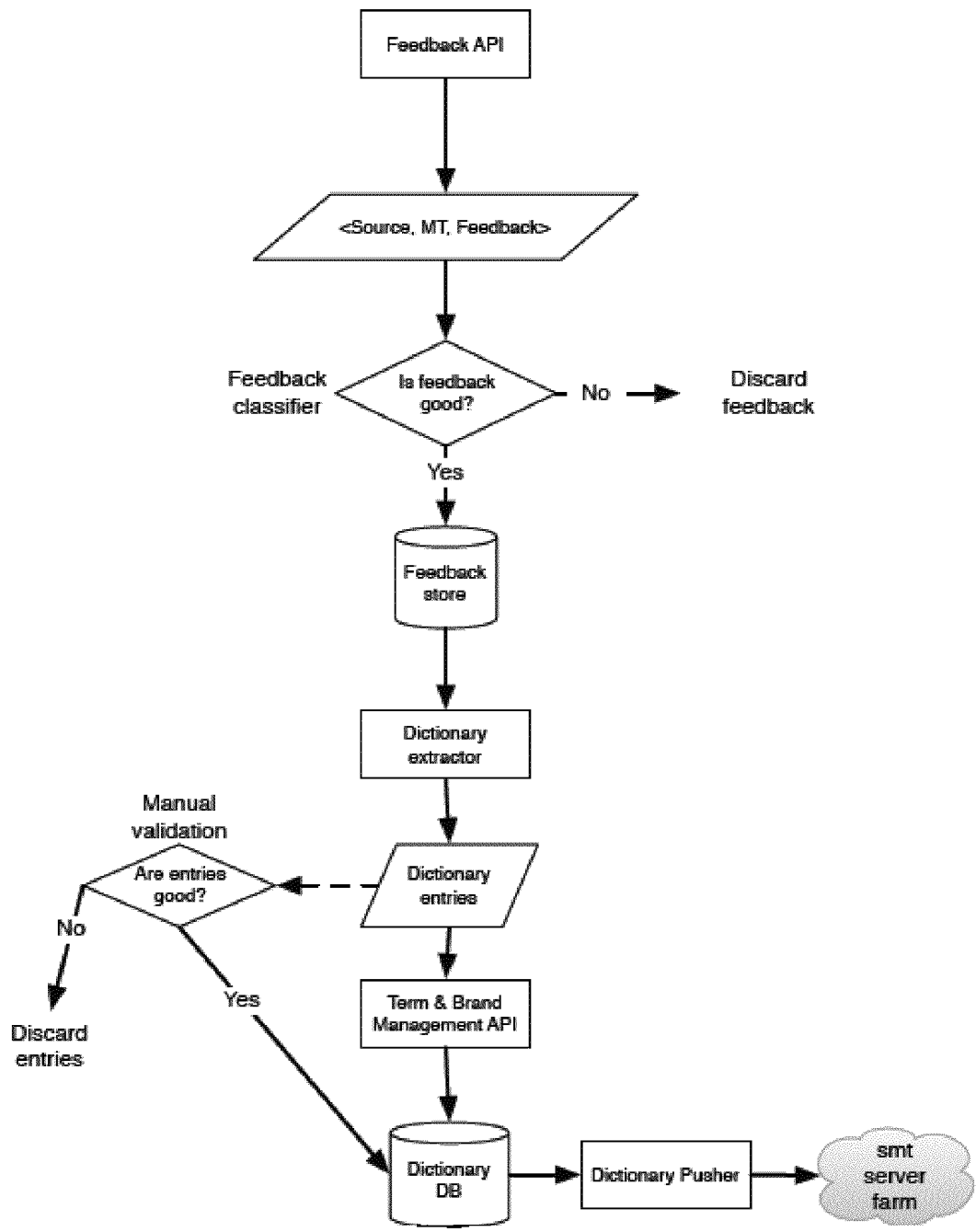
FIG. 4 is a flowchart of an exemplary method for processing translation feedback, extracting dictionary entries, and updating a translation methodology of a machine translation system.

FIG. 4 illustrates another exemplary method for processing translation feedback, extracting dictionary entries, and updating a translation methodology of a machine translation system.

Figure 5:
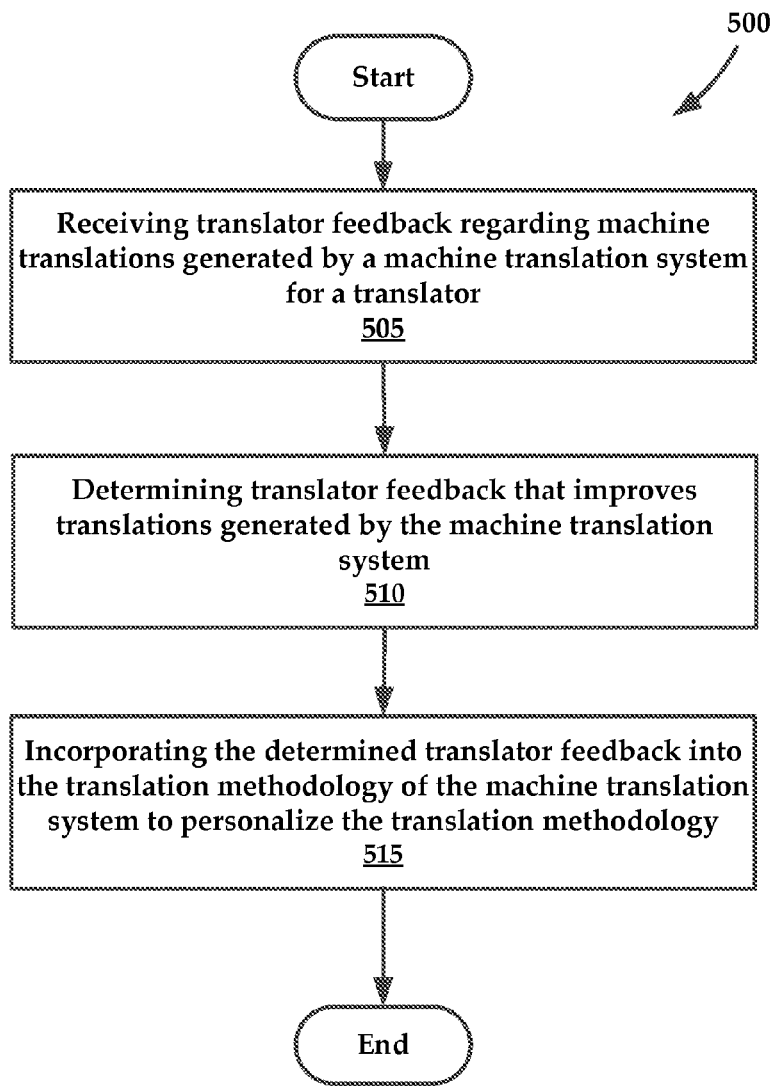
FIG. 5 is a flowchart of another exemplary method for managing a personalized machine translation system.

FIG. 5 is a flowchart of an exemplary method 500 for managing a personalized machine translation system. The method may comprise a step 505 of receiving translator feedback regarding machine translations generated by a machine translation system for a translator. Again the machine translation system may utilize a translation methodology (or multiple methodologies) for translating source language texts into target language texts. The method may also comprise a step 510 of determining translator feedback that improves translations generated by the machine translation system, as well as a step 515 of incorporating the determined translator feedback into the translation methodology of the machine translation system to personalize the translation methodology.

Figure 6:
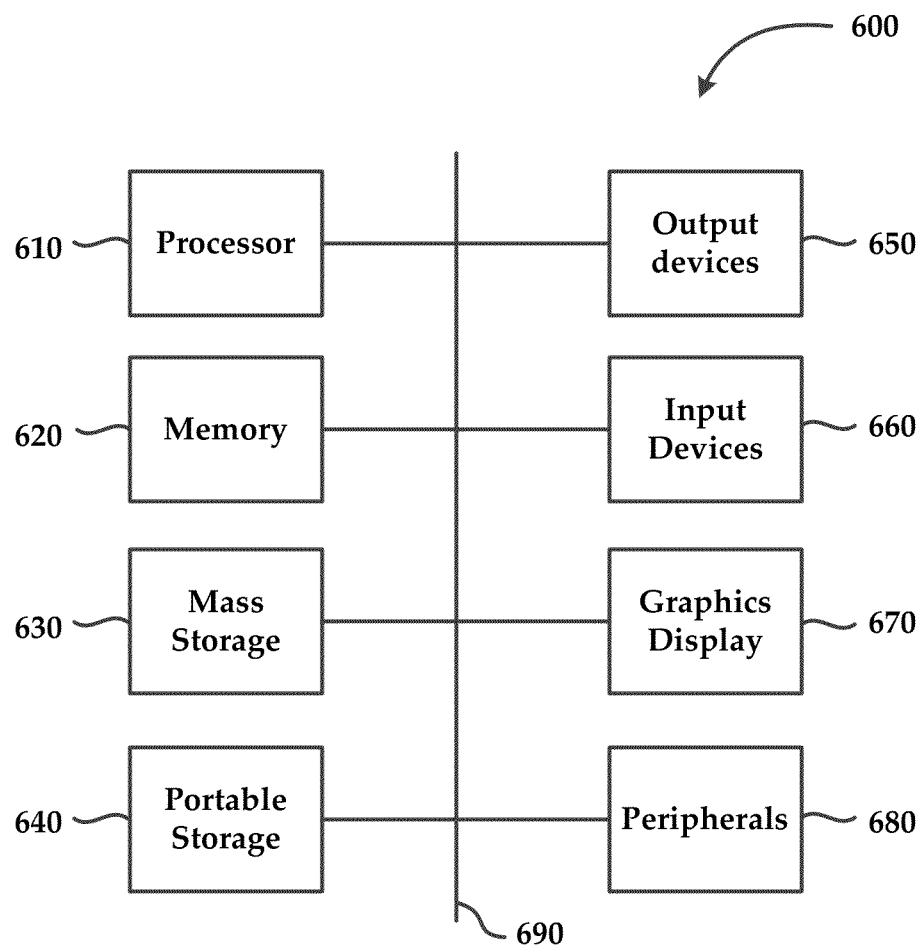
FIG. 6 is a block diagram of an exemplary computing system for implementing embodiments of the present technology.

FIG. 6 illustrates an exemplary computer system 600 that may be used to implement an embodiment of the present technology. The computer system 600 of FIG. 6 may be implemented in the contexts of the likes of computing systems, networks, exchanges, servers, or combinations thereof disclosed herein. The computer system 600 of FIG. 6 includes one or more processors 610 and main memory 620. Main memory 620 stores, in part, instructions and data for execution by processor 610. Main memory 620 may store the executable code when in operation. The computer system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. The components may be connected through one or more data transport means. Processor unit 610 and main memory 620 may be connected via a local microprocessor bus, and the mass storage device 630, peripheral device(s) 680, portable storage device 640, and graphics display 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 may store the system software for implementing embodiments of the present technology for purposes of loading that software into main memory 620.

Portable storage device 640 operates in conjunction with a portable non-volatile storage medium, such as a floppy disk, compact disk, digital video disc, or USB storage device, to input and output data and code to and from the computer system 600 of FIG. 6. The system software for implementing embodiments of the present technology may be stored on such a portable medium and input to the computer system 600 via the portable storage device 640.

Input devices 660 provide a portion of a user interface. Input devices 660 may include an alphanumeric keypad, such as a keyboard, for inputting alpha-numeric and other information, or a pointing device, such as a mouse, a trackball, stylus, or cursor direction keys. Additionally, the computer system 600 as shown in FIG. 6 includes output devices 650. Suitable output devices include speakers, printers, network interfaces, and monitors.

Graphics display 670 may include a liquid crystal display (LCD) or other suitable display device. Graphics display 670 receives textual and graphical information, and processes the information for output to the display device.

Peripherals devices 680 may include any type of computer support device to add additional functionality to the computer system. Peripheral device(s) 680 may include a modem or a router.

The components provided in the computer system 600 of FIG. 6 are those typically found in computer systems that may be suitable for use with embodiments of the present technology and are intended to represent a broad category of such computer components that are well known in the art. Thus, the computer system 600 of FIG. 6 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for managing a personalized machine translation system, the method comprising:
   receiving translator feedback regarding machine translations generated by a machine translation system for a translator, the machine translation system using a translation methodology, the translator feedback comprising a triple having a source unit, a translation unit of the source unit, and a correction unit;
   determining translator feedback that improves translations generated by the machine translation system;
   incorporating the determined translator feedback into the translation methodology of the machine translation system to personalize the translation methodology, the incorporation of the translator feedback comprising:
      constructing a first translation table that comprises pairs of source units and correction units;
      extracting dictionary entries from the translator feedback by:
         preparing the pairs for alignment,
         aligning words included in the pairs, and
         extracting first phrase pairs based upon word alignment;
      constructing a second translation table that comprises pairs of source units and translation units; and
      extracting dictionary entries from the translator feedback by:
         preparing the pairs for alignment,
         aligning words included in the pairs, and
         extracting second phrase pairs based upon word alignment; and
   filtering the first and second phrase pairs by:
      selecting first and second phrase pairs having a threshold amount of words included in the phrase;
      selecting first and second phrase pairs that have terminal words which are aligned; and
      including the selected first and second phrase pairs in the translation methodology of the machine translation system.

2. The method according to claim 1, wherein the translation methodology comprises any of corpus-based machine translation, rule-based machine translation, transfer-based machine translation, hybrid-based machine translation, statistic-based machine translation, a translation memory, a language model, a translation dictionary, a phrase table, or any combination thereof.

3. The method according to claim 1, further comprising evaluating the translator feedback prior to the step of incorporating the translator feedback into the translation methodology to determine if the translator feedback comprises an improved translation relative to a translation generated by the machine translation system without the translator feedback.

4. The method according to claim 1, wherein the translator feedback includes corrections that are received from the translator relative to a previous translation generated by the machine translation system.

5. The method according to claim 4, further comprising providing the corrections to a human translator and receiving verified corrections from the human translator, wherein the verified corrections are incorporated into the translation methodology.

6. The method according to claim 1, further comprising evaluating translator feedback using a parallel corpus to validate the translator feedback.

7. The method according to claim 6, wherein the parallel corpus is selected by determining a domain associated with the translator and selecting a parallel corpus having a domain that is substantially similar to the domain of the translator.

8. The method according to claim 1, further comprising providing an accuracy rating for any of the translation unit, the correction unit, or combinations thereof.

9. A personalized machine translation system, the system comprising:
a feedback processor that receives translator feedback regarding machine translations generated by a machine translation system for a translator, the machine translation system using a translation methodology;
a feedback classifier that determines translator feedback that improves translations generated by the machine translation system, the translator feedback comprising a triple having a source unit, a translation unit of the source unit, and a correction unit;
a dictionary pusher that incorporates the translator feedback into the translation methodology of the machine translation system to personalize the translation methodology; and
a dictionary extractor that:
constructs a first translation table that comprises pairs of source units and correction units;
extracts dictionary entries from the translator feedback by:
preparing the pairs for alignment,
aligning words included in the pairs, and
extracting first phrase pairs based upon word alignment;
constructs a second translation table that comprises pairs of source units and translation units; and
extracts dictionary entries from the translator feedback by:
preparing the pairs for alignment,
aligning words included in the pairs, and
extracting second phrase pairs based upon word alignment; and
filters the first and second phrase pairs by:
selecting first and second phrase pairs having a threshold amount of words included in the phrase,
selecting first and second phrase pairs that have terminal words which are aligned, and
storing the selected first and second phrase pairs in a translation phrase table that resides on a data repository.

10. The system according to claim 9, wherein the translation methodology comprises any of corpus-based machine translation, rule-based machine translation, transfer-based machine translation, hybrid-based machine translation, statistic-based machine translation, a translation memory, a language model, a translation dictionary, a phrase table, or any combination thereof.

11. The system according to claim 9, wherein the feedback classifier further evaluates the translator feedback prior to the dictionary pusher incorporating the translator feedback into the translation methodology to determine if the translator feedback comprises an improved translation relative to a translation generated by the machine translation system without the translator feedback.

12. The system according to claim 9, wherein the feedback classifier further evaluates translator feedback using a parallel corpus to validate the translator feedback, wherein the parallel corpus is selected by determining a domain associated with the translator and selecting a parallel corpus having a domain that is substantially similar to the domain of the translator.

13. The system according to claim 9, wherein the translator feedback includes corrections that are received from the translator relative to a previous translation generated by the machine translation system.

14. The system according to claim 13, wherein the feedback processor further provides the corrections to a human translator and receives verified corrections from the human translator, wherein the verified corrections are incorporated into the translation methodology.

15. A method for managing a personalized machine translation system, the method comprising:
receiving translator feedback regarding machine translations generated by a machine translation system for a translator, the machine translation system using a translation methodology;
determining translator feedback that improves translations generated by the machine translation system;
determining one or more translation preferences for the translator;
incorporating the determined translator feedback and the translation preferences into the translation methodology of the machine translation system to personalize the translation methodology; and
generating a tuning corpus by:
calculating a weighted value for each feature of a feedback-based phrase pair,
adding the weighted values together into an overall quality value, and
incorporating the feedback pair into the tuning corpus if the overall quality value meets or exceeds a threshold value.

16. The method according to claim 15, wherein the one or more translation preferences comprises a domain for the translator.

17. The method according to claim 15, wherein the translation methodology further comprises feedback-based phrase pairs that include word alignments between source and correction sentence pairs.

18. The method according to claim 17, further comprising incorporating the feedback-based phrase pairs into a phrase pair database by analyzing features of the feedback-based phrase pairs, the features comprising properties that provide information indicative of a utility of the feedback-based phrase pairs.

19. The method according to claim 15, further comprising:
selecting new weights for features values to improve overall quality of future translations;
generating translations for translation requests; and
collecting new feedback-based translation pairs.

20. The method according to claim 15, further comprising determining if a feedback set is licensed, the feedback set comprising source text, a translation of the source text, and at least one correction for the translation, wherein the feedback set is licensed if the feedback set is included in an original machine translation of a sentence and in the at least one correction of the translation.

21. A method for managing a personalized machine translation system, the method comprising:
receiving translator feedback regarding machine translations generated by a machine translation system for a translator, the machine translation system using a translation methodology comprising feedback-based phrase pairs that include word alignments between source and correction sentence pairs;
determining translator feedback that improves translations generated by the machine translation system;
determining one or more translation preferences for the translator;
incorporating the determined translator feedback and the translation preferences into the translation methodology of the machine translation system to personalize the translation methodology;
incorporating the feedback-based phrase pairs into a phrase pair database by analyzing features of the feedback-based phrase pairs, the features comprising properties that provide information indicative of a utility of the feedback-based phrase pairs; and
determining features of a feedback-based phrase pair by simulating phrase pair statistics using any of accumulated statistics for low-frequency words or established default values.

\* \* \* \* \*